United States Patent [19]

Sitrick

[11] Patent Number: 5,553,864
[45] Date of Patent: Sep. 10, 1996

[54] USER IMAGE INTEGRATION INTO AUDIOVISUAL PRESENTATION SYSTEM AND METHODOLOGY

[76] Inventor: David H. Sitrick, 820 Burchell Ave., Highland Park, Ill. 60035

[21] Appl. No.: 887,715

[22] Filed: May 22, 1992

[51] Int. Cl.$^6$ ............................................. A63F 9/22
[52] U.S. Cl. ................................... 463/31; 463/35
[58] Field of Search .................................. 273/433, 434, 273/435, 436, 437, 460, DIG. 28

[56] References Cited

U.S. PATENT DOCUMENTS

| | | | |
|---|---|---|---|
| 4,149,716 | 4/1979 | Scudder | 273/434 |
| 4,445,187 | 4/1984 | Best | 273/434 |
| 4,521,014 | 6/1985 | Sitrick | 273/434 |
| 4,572,509 | 2/1986 | Sitrick | 273/434 |
| 4,633,416 | 12/1986 | Walker | 273/DIG. 28 |
| 4,662,635 | 5/1987 | Enokian | 273/856 |
| 4,688,105 | 8/1987 | Bloch et al. | 358/335 |
| 4,710,873 | 12/1987 | Breslow et al. | 273/DIG. 28 |
| 5,112,051 | 5/1992 | Darling et al. | 273/435 |
| 5,190,285 | 3/1993 | Levy et al. | 273/237 |
| 5,218,455 | 6/1993 | Kristy | 358/403 |

FOREIGN PATENT DOCUMENTS

| | | | |
|---|---|---|---|
| 3275092 | 12/1991 | Japan | 273/435 |
| 3284277 | 12/1991 | Japan | 273/460 |
| 2163929 | 3/1986 | United Kingdom | 273/85 G |

Primary Examiner—Jessica J. Harrison

[57] ABSTRACT

A video game adapter interface apparatus has a user input device and an associated video display. The user selects a distinguishable visual image representation for association into a video game's audiovisual presentation, such as where that user is identified. For example, color, size graphics or shape can be used to distinguish users. In one embodiment a digitized image of each user's face is used as the distinguishable representation. Alternatively, the user can create an original image or select one of a predetermined set of visual images as the user's identification for use in the video game audiovisual presentation. In a preferred video game embodiment, the video game adapter interface system is coupled to a video game system and a storage card containing User Images. The video game adapter interface system then integrates a selected User Image from the Storage Card into the video game's audiovisual presentation, and can also integrate the User Image into the video game play. For non-User Image video game software and for non-video game and audiovisual presentations, an Intercept Adapter Interface Systems permits the integration of User Images into the audiovisual presentation in place of and/or in addition to predefined character images otherwise present in the audiovisual presentation.

59 Claims, 21 Drawing Sheets

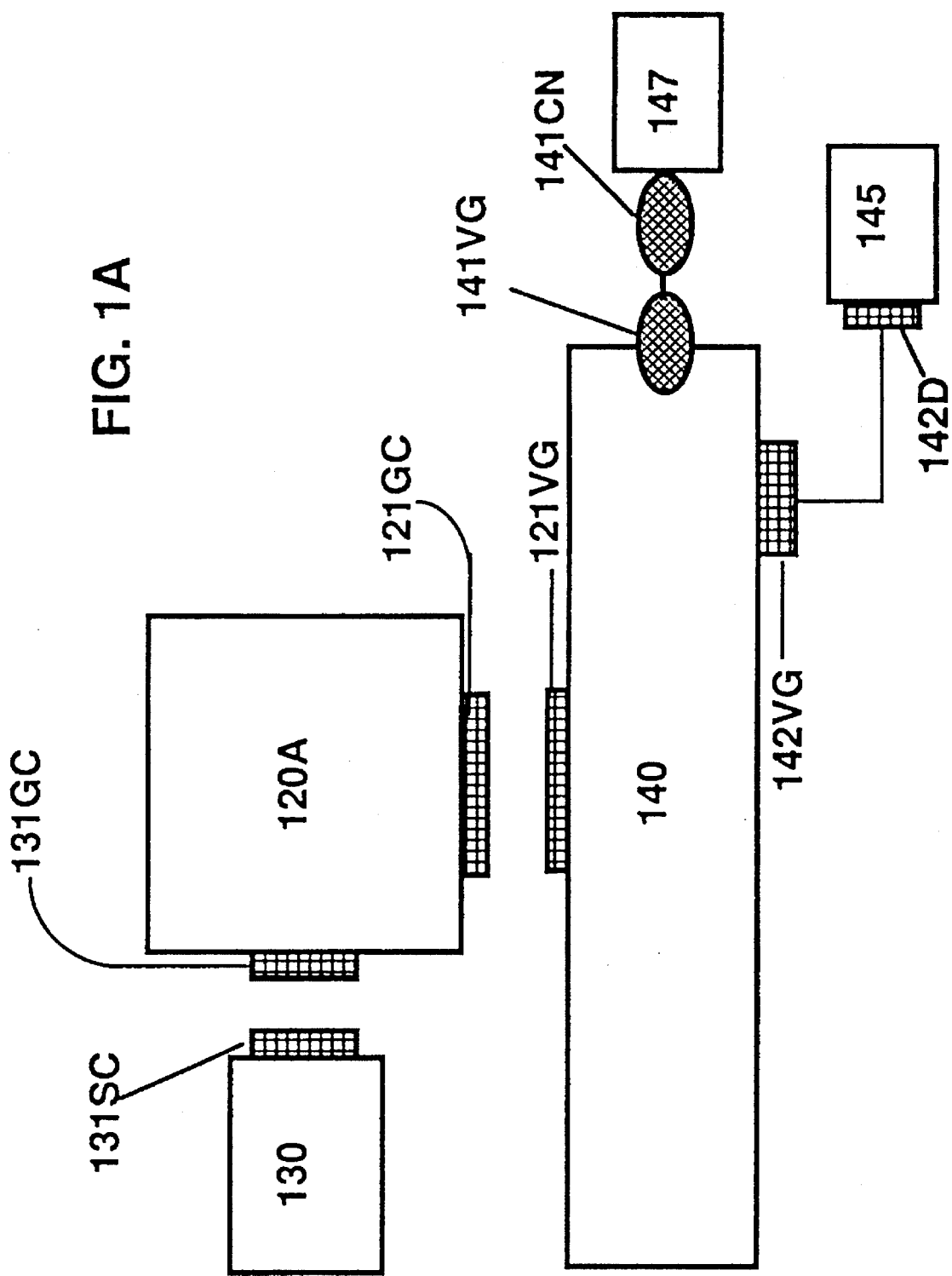

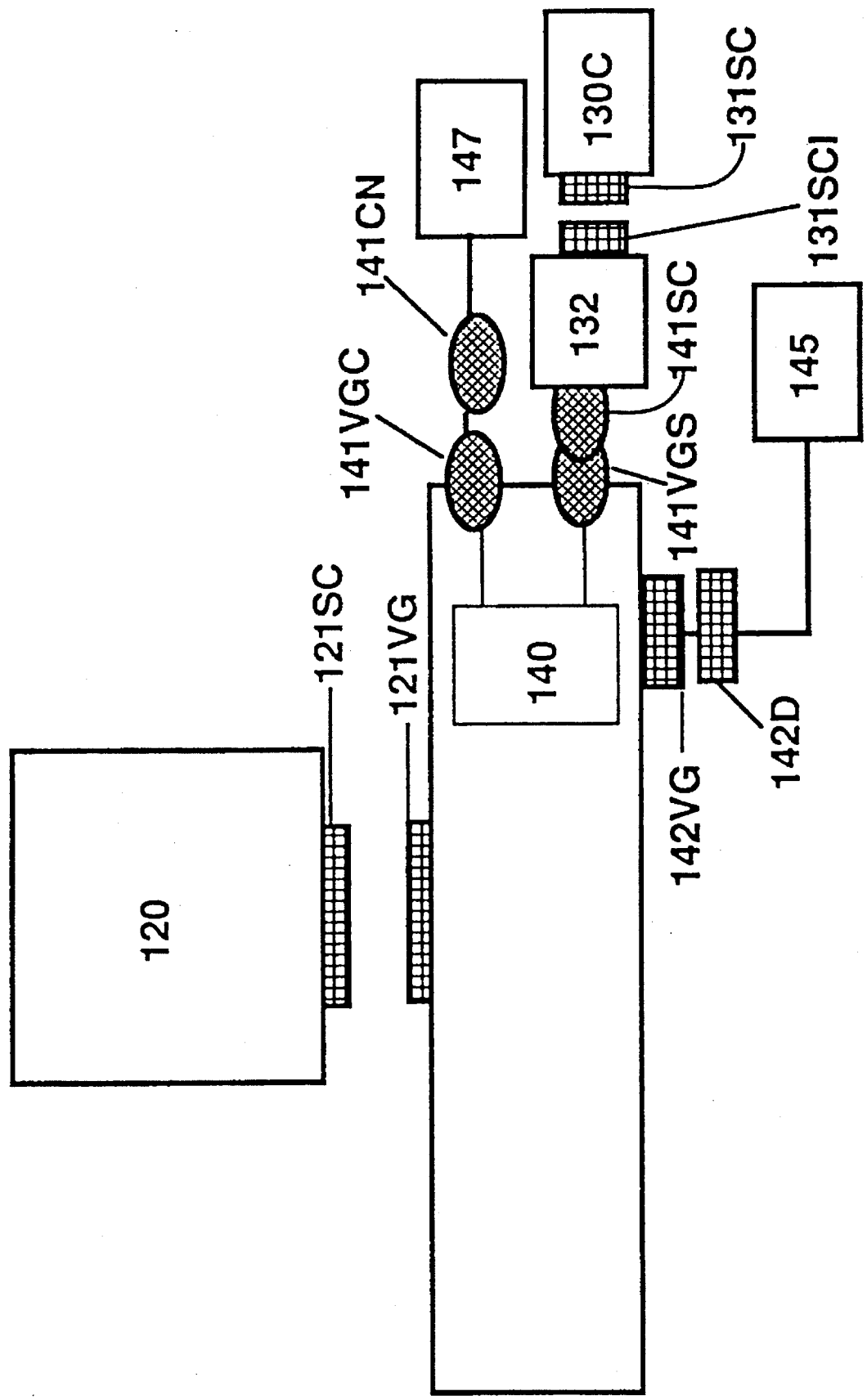

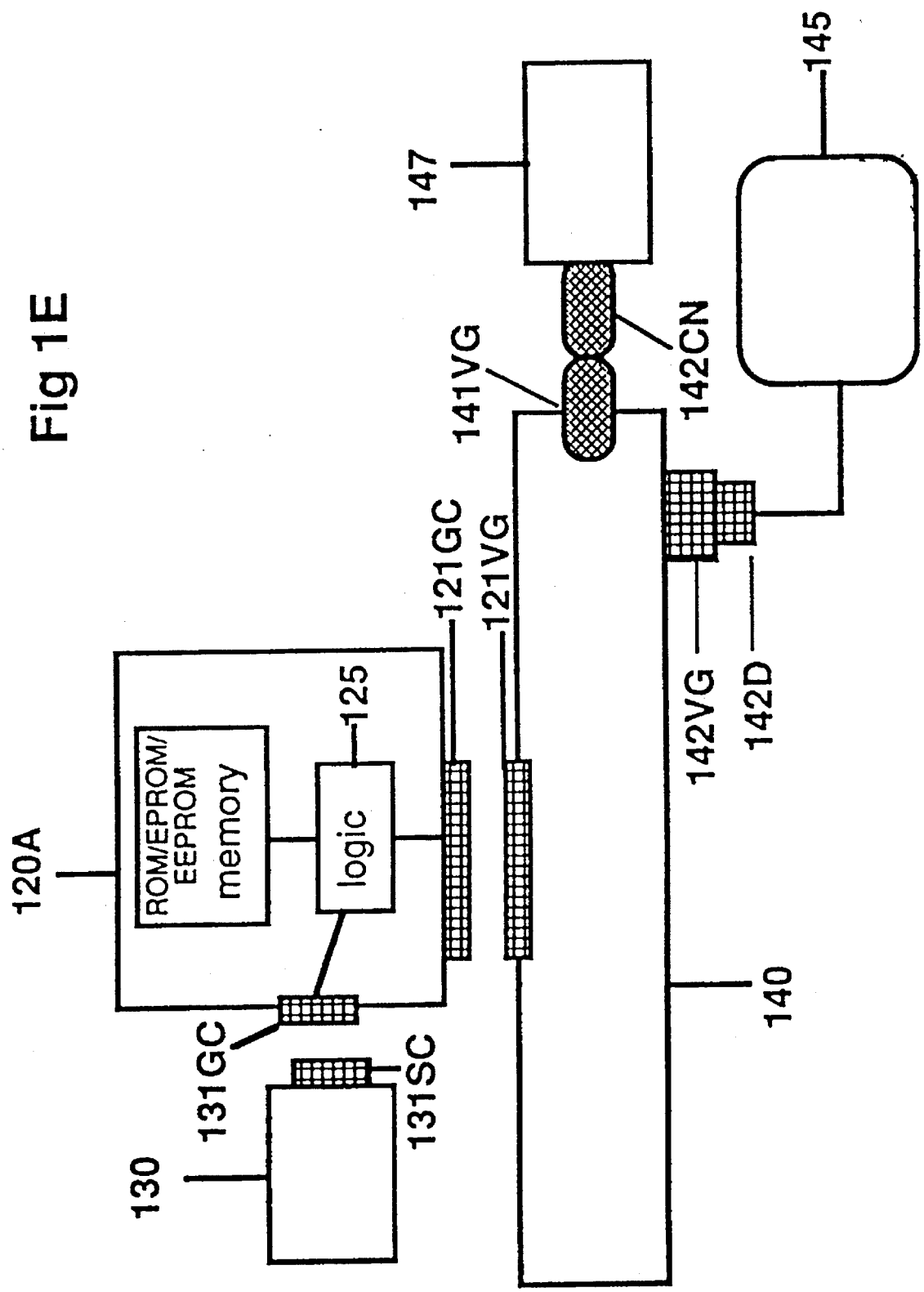

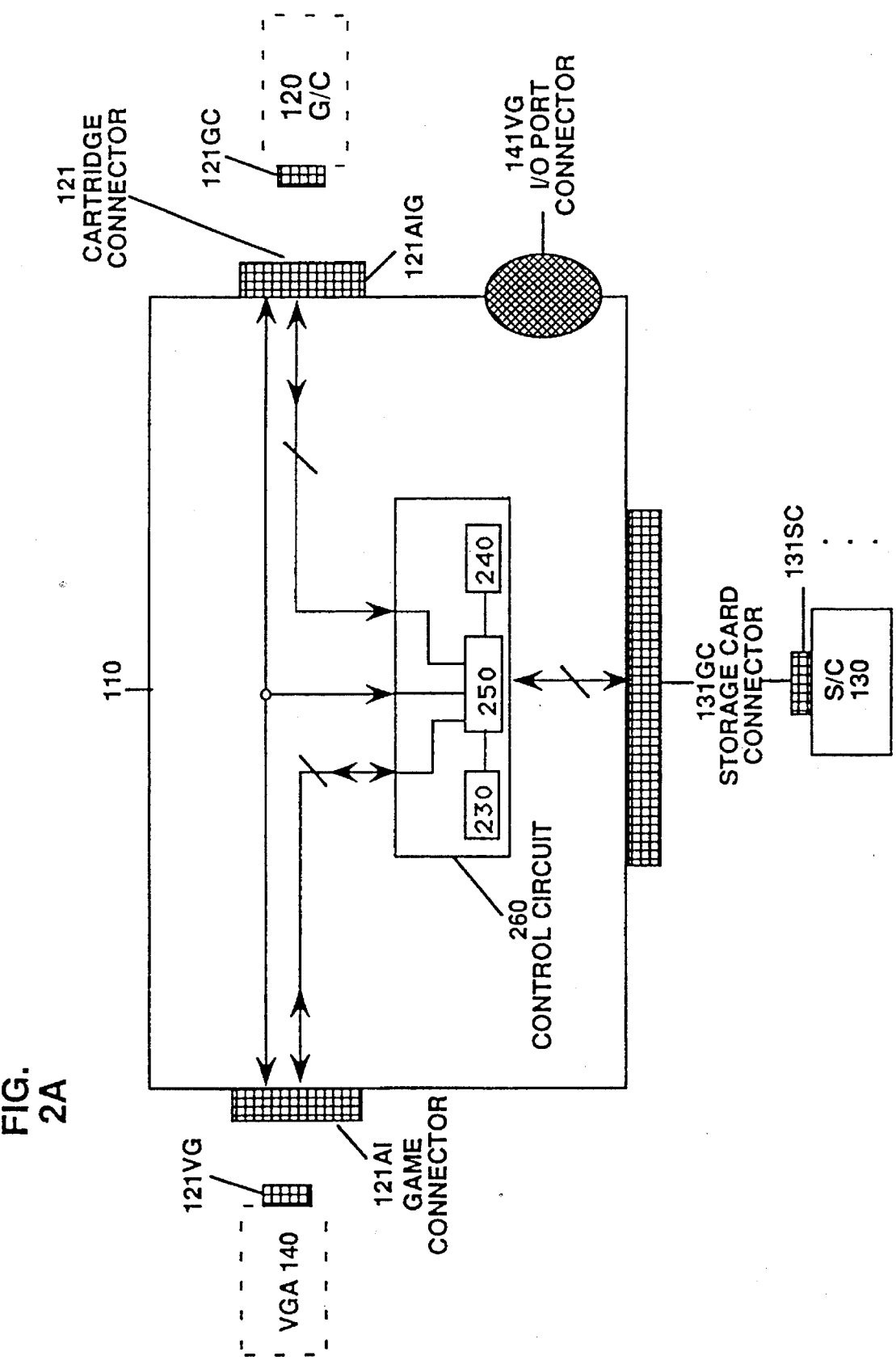

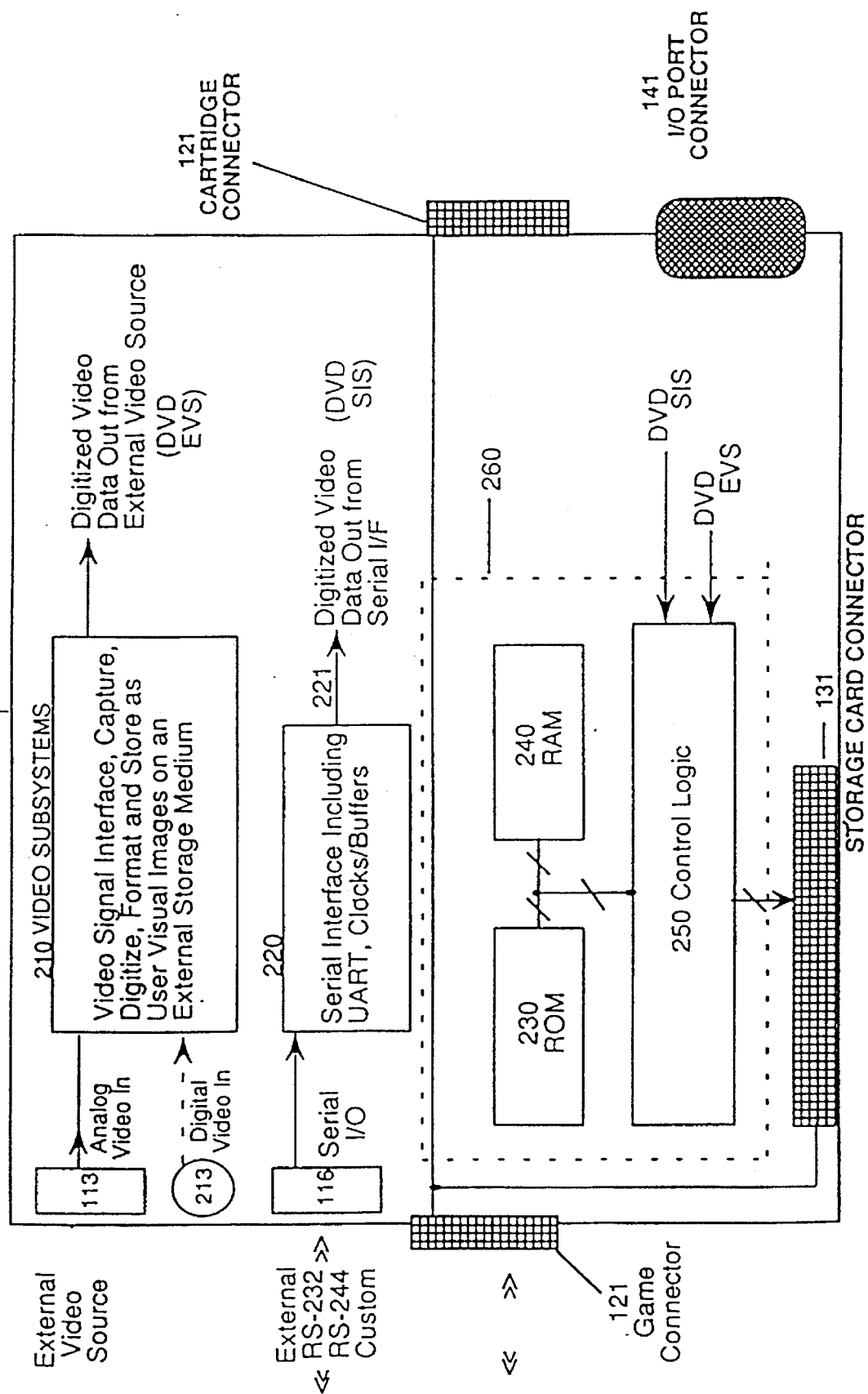

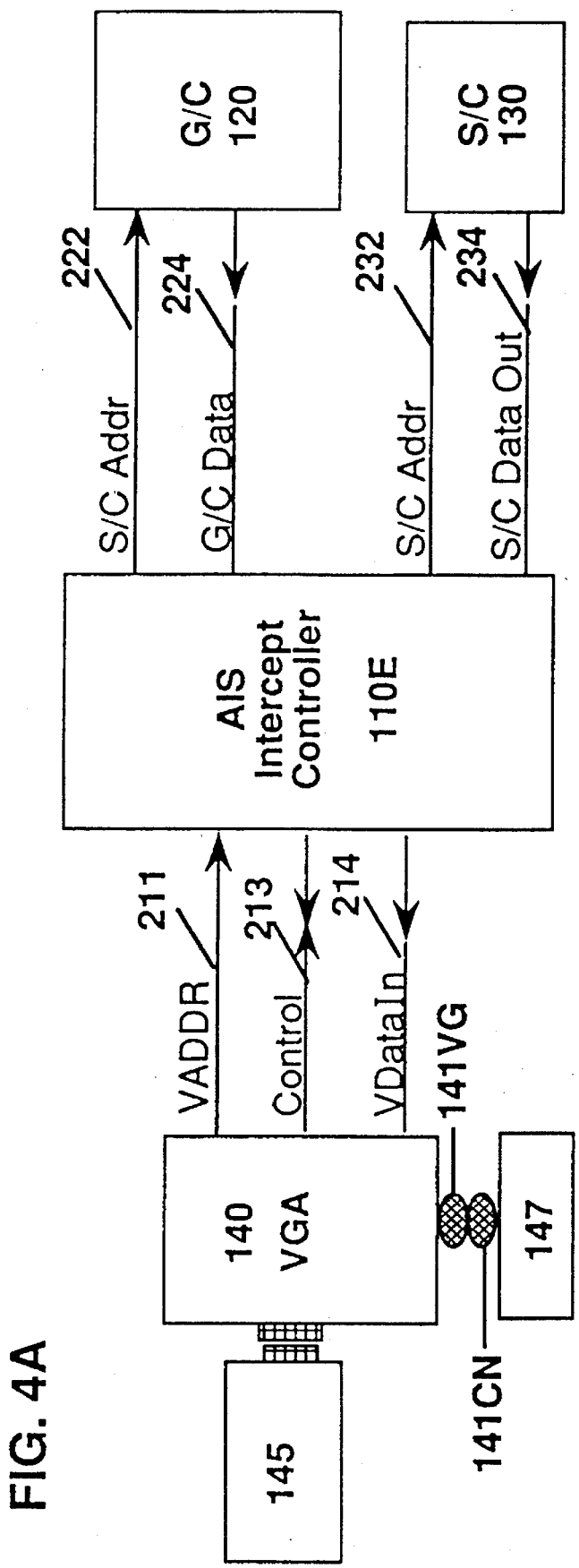

USER IMAGE INTEGRATION INTO AUDIOVISUAL PRESENTATION SYSTEM AND METHODOLOGY

This invention relates to video games, and more particularly to a video game player character image development system and methodology for smooth integration of user created video graphics into a predefined video game system, and to an adapter interface system which provides for the utilization of a user visual image as a preselected character segment, such that the user visual image is incorporated into the audiovisual presentation of the video game to which the adapter interface system is coupled.

Heretofore, video games have been self contained, and have not provided the ability for the user to integrate in a user-defined or -provided visual or audio image. Subsequent to the invention of U.S. Pat. No. 4,521,014, video games have been created which utilized predefined digitized images in the video game which supplement the otherwise cartoon-like character and imagery of the game. Additionally, digital and analog video data have been merged with video games to get broadcast quality video for certain aspects of the video display for the video game, particularly in arcade games, but more recently in home video games with attached CD-ROM player. However, heretofore, there has been no system which has provided for the utilization of user provided or created visual images in the video game.

It is therefore an object of the present invention to provide a system which utilizes an image generated by an external source (of video and/or audio and/or computer generated), and integrates the image into and as part of a pre-existing audiovisual work (such as from a video game system or a movie or animation) which utilizes the user's image in the video game play or as a synthetic participating user image in the audiovisual presentation, such that the user image is incorporated into the audiovisual presentation of the user interactive video game.

It is further an object of the present invention to optimally benefit from the user video and audio image in video games and to develop a methodology for creating video games compatible with user image integration concepts.

It is an additional object to provide a system and methodology for orderly transfer and integration of the user created visual image, or images, into the video game.

It is a further object of the present invention to provide various means for users of video game apparatus to capture and/or provide for placement and storage of the user's visual image onto a medium which can be coupled either via an adapter or directly to one or more game systems and/or game cartridges which connect to the game systems.

SUMMARY OF THE INVENTION

In accordance with the present invention, a user image in video game or other audiovisual presentation system design methodology and architectural structuring, in combination with a user image development system, provides an environment whereby a user can create a video or other image utilizing any one of a plurality of input device means,) and whereby the user created image is provided in a format and through a medium by which the user created image can be communicated and integrated into the audiovisual presentation, and game play of a video game. The video game design complements this, and game integration means are provided for mapping user created image data into the video game system structure such that the user image is integrated into the video game play and presentation.

A game image and logic structuring is provided such that user created image data can be easily integrated into the game structure for integral operation in a monolithic and homogeneous fashion. A class of games is made possible, which are playable under whatever rules are set forth by the game creator, wherein all of these games integrate with the various ones of the user created visual images through a common format and methodology. Means for user image creation allows the user to input the user's player representative characters. This input can be by any one of a number of means such as by original creation by the user by any means (from audio analysis to a graphics development system, by user assembly of predefined objects or segments, by digitization scan of an external object such as of a person by video camera or a photograph or document [by a scanner, etc.]). The user image creation system creates a mappable (absolute or virtual) link of the user defined images for integration into other graphics and game software packages, such as where the user defined or created visual images are utilized in the video presentation of the video game as a software function such as one or more of the preselected character imagery segment(s) associated with the user's play of the game or as a particular character or other video game software function in the game (e.g., hero, villain, culprit, etc.) and/or a particular portion and/or perspective view of a particular character, such that one or more of the user visual images and/or sounds is incorporated into the audiovisual presentation and play of the resulting video game.

A user image linker system and methodology provide for user image to application software mapping and linking of user image and integration data (e.g., such as to games packages, graphics and other applications software, sound synthesizers, high level language development software, etc.), and further provides mapping and linking of user image and integration data to operating systems such as for standard personal computers (e.g., the Macintosh, MS-DOS, WINDOWS, OS/2, Apple II,CP/M, MSX, UNIX, Amiga, etc.) and for video game operating systems (such as the Sega Genesis, Nintendo NES, or Super NES, etc. Linkage to operating systems can be structured in any conventional manner such as a callable subroutine, or an operating system function call (independent of any application software).

In accordance with another aspect of the present invention, an adapter interface system couples into the video game apparatus, and provides means for the user to create one or more user images, means for storage of formatted user image data onto a storage medium, and means for interfacing with a video game system to utilize the user image from the storage medium.

In accordance with one embodiment of the present invention, there is provided a video game interface adapter system, comprised of a video interface for utilization of video from an external video source (e.g., camera, VCR, etc.) for digitizing, formatting and storing the external video source image as user image data and storing the formatted video image data onto the storage medium, which can thereafter be independently utilized to couple the user's formatted video image to the video game system for incorporation therein. A user image medium interface connector and subsystem, couples user visual image data from previously programmed user image cards for integration of the user visual images into the video game play and presentation of the video game apparatus to which the video game adapter interface system is coupled.

In accordance with another aspect of the present invention, a home video game intercept adapter interface system is provided, which couples to a video game system and to the user image storage medium, and which couples to non-user image based video game software (especially valuable for use with preexisting game software), such that the intercept adapter interface system intercepts requests for respective predefined character image data which are associated with the user images, and substitutes the respective image data for the user images in place of the intercepted images as appropriate, in a manner transparent to the existing software. The intercept adapter system is coupled to the game connector of a host video game system ("VGS") which provides a host video game display, and an associated game card/cartridge containing the game software which provides game data signals. The intercept adapter system is comprised of an interface for coupling the game signals from the game connector to the adapter system. An interface couples signals to and from the external game cartridge which contains rules and instructions for an associated video game, to the adapter system. An analysis system analyzes the signals associated with the predefined character imagery segments associated with the user images and selectively modifies certain ones of the game data signals to substitute therefor the data signals for user images associated with preselected character imagery segments, and selectively outputs the substituted certain ones of the game data signals in place of the initial respective ones of the game data signals to the host video game for utilization therein, whereby the user image is associated with the preselected character imagery segment so that the user image is incorporated into the audiovisual presentation of the video game.

In accordance with another aspect of the present invention, a self service booth can be utilized at various locations supporting the sales of the user image in video games, both home and coin operated games. The booth provides a means for permitting the user to create and save the user information on a storage medium, which can then be more simply coupled to an interface connector on the home video game system or to an arcade game. The booth can also provide attract mode video game display presentations of various different video game display presentations where the user image is integrated into the attract mode video game display presentation. Alternatively, or additionally, a service bureau can be utilized to provide services via mail-in or walk-in operations.

BRIEF DESCRIPTION OF THE DRAWINGS

These and other aspects of the present invention can be better understood by reference to the detailed description of the accompanying drawings, wherein, FIG. 1A illustrates an embodiment of a user image adapter interface system used in conjunction with a video game apparatus, a user image storage card, and a video game software or firmware card, in accordance with the present invention;

FIG. 1C illustrates the system of FIG. 1A, except that the storage card is coupled to an input/output port of the video game apparatus instead of to the game cartridge connector, in accordance with the present invention;

FIG. 1E illustrates an embodiment of a user image adapter interface system combined within a game card, used in conjunction with a video game apparatus and in accordance with the present invention;

FIG. 2A illustrates the adapter interface system of FIG. 1A in greater detail;

FIG. 2B illustrates the adapter interface system of FIG. 1B in greater detail, illustrating the adapter interface system with a video interface, an interface to the storage card for user image storage, and serial computer interface, adapted for coupling to the video game apparatus, to the image storage card and to the game firmware/software card or cartridge, in accordance with the present invention;

FIG. 4A illustrates the block diagram and data logic flow diagram of an Adapter Interface System such as in FIGS. 2A and 2B, with the addition of an Intercept Controller system, in accordance with the present invention;

Figure 1B:
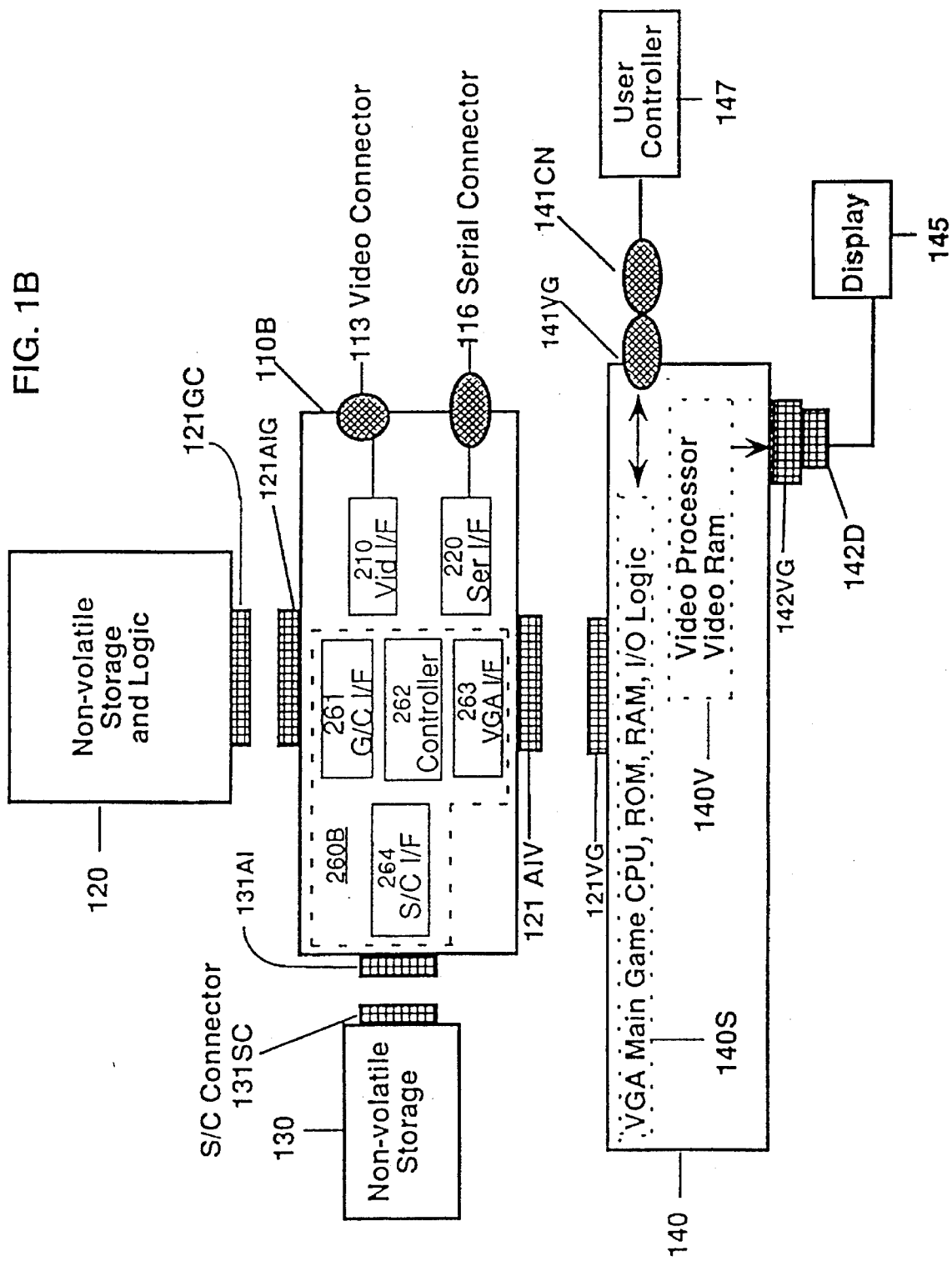
FIG. 1B illustrates the user image adapter interface system of FIG. 1A which additionally includes means for user input of user visual images and storage onto a user visual image storage medium in accordance with the present invention.

There are many complex subject areas cooperatively intertwined in the present invention, and discussed in the description herein.

Ample textual material documents each of the subject areas. Therefore, in the interest of conciseness and to aid in more clearly understanding the present invention, the following references are disclosed and incorporated herein by reference.

U.S. Pat. No. 4,521,014 entitled, "Video Game Including User Visual Image."

U.S. Pat. No. 4,710,873, entitled "Video Game Incorporating Digitized Images of Being Into Game."

There are a number of texts providing detailed information on computer graphics, digitization and formatting of digitized video information, and interactive computer graphics, including data structures, algorithms and languages. Five of the better books on the subject include, *Principles of Interactive Computer Graphics,* by William M. Newman and Robert F. Sproull, published by McGraw Hill, copyright 1973, 1979; *Fundamentals of Interactive Computer Graphics,* by J. D. Foley and A. Van Dam, published by Addison West Publishing Co., copyright 1982; (second edition, copyright 1991); *Procedural Elements For Computer Graphics,* by David Rogers; *Graphics Gems,* edited by Andrew Glassner; *Digital Image Warping,* by George Wolberg; *Graphics Gems II,* edited by James Arvo; *Interactive Computer Graphis,* by Wolfgang K. Giloi, published by Prentice-Hall, copyright 1978; *Computer Vision,* by Dana H. Ballard and Christopher M. Brown, published by Prentice-Hall, copyright 1982; *Digital Processing of Speech Signals,* by L. R. Rabiner and R. W. Schafer, published by Prentice-Hall, copyright 1978 by Bell Laboratories, Inc.; *Tutorial: Computer Graphics, Second Edition,* by John C. Beatty and Kellogg S. Booth, published by the Computer Society Press of the IEEE Computer Society, Institute of Electrical and Electronics Engineers, Inc., copyright 1982; *Tutorial of Selected Readings and Interactive Computer Graphics,* by Herbert Freeman, published by the IEEE Computer Society, copyright 1980 and later published documents by the IEEE; *SIGRAPH* proceedings, 1981 to 1991: Course Materials from those proceedings. Additionally, there are numerous application reports and data sheets and magazine articles regarding utilization of new technology, and existing technologies in such areas as digital signal processing, video image signal capture, digitization, formatting, storage, compression, etc. There are also numerous reference materials and off-the-shelf products available for audio capture, digitization, formatting, compression and storage.

It is to be understood that the specifics of particular techniques such as video and audiosignal capture, digitization, storage, compression and formatting are not limitations on the present invention, as any of a number of available techniques and technologies can be utilized, including off the shelf available products ranging from stand-alone systems, chip sets, BUS-STANDARD plug-in board systems (such as NU-BUS, IEEE-488, Multibus I and II, S-100 Bus, Standard Bus, PC-AT bus, Micro Channel Bus, etc.). Available stand-alone systems, Subsets of technology of the kind developed and used in a 1990 model of an Eastman Kodak Company's "Hybrid Imaging System" performed 6 megapixel/second image scans, initially storing approximately 18 megabytes (3,078 8 bit deep samples) of data for a 35 mm film image (each second), image and data compression of 3:1, compressed in real-time. The Kodak Photo CD System takes images from 35 mm film, digitizes, compresses and formats the image data for storage on disk to be replayed on computer or television monitors. The commercially available Canon Still Video Camera records images as single frames of video on floppy disk and with a Canon Digitizer attachment, permits interface for storage as an ordinary graphics file on a personal computer (e.g., Apple Macintosh). In addition, the techniques and technologies being brought to "virtual reality" lend themselves to application of the user visual image in a video game invention and to the teachings of the present invention.

Audio signals may be equivalently processed and utilized. These represent additional extensions of the present invention. Audio signals go beyond simple spoken words and phrases, or explosions or other sounds. Audio signals can be analyzed and processed to generate voice parameters which are then used by the system to synthetically generate a voice corresponding to and sounding like the audio signals from which the voice parameters were modeled (e.g., the actual user's voice, tonal quality, pitch, etc.).

DETAILED DESCRIPTION OF THE DRAWINGS

Referring to FIG. 1A, a user image adapter interface system 110 is coupled to a video game apparatus 140. Coupling of electrical signals between the video game apparatus 140 and adapter interface system 110, including address, data, power, and control signals. The video game apparatus 140 is comprised of a video game computing system including a microprocessor, ROM, RAM, a video interface (which may include its own video processor and video RAM or may utilize and share the function via the microprocessor), which video interface couples through mating connectors 142VG for coupling to a mating connector 142D on a display monitor 145. The video game apparatus 140 also includes input/output ("I/O") which provides for coupling of signals between the video game computing system via connector 141VG and a user controller 147 via connector 141CN, where one or more controllers 147 may be coupled to a specific I/O port, or where they may alternatively be multiple I/O ports for coupling of multiple inputs independent of one another. Examples of video game apparatus 140 include those manufactured by Sega, such as the Sega of America, Incorporated's Genesis Video Game System which utilizes the Motorola 68000 microprocessor, has ROM, RAM, a video display processor, video memory, a sound processor, I/O processing capability, etc.; Nintendo video game systems for the home including the Nintendo Entertainment System (NES) and the Super NES Systems respectively utilize eight and sixteen bit processors. Many other dedicated video game apparatus exist such as from Sega, Nintendo, Atari, NEC, Sony and others. The present invention also extends to include personal computers which are operated as video game apparatus, whereby the adapter interface system can be utilized as a plug-in board coupled to a computer electronic signal interface bus (such as in the Apple II, Apple Macintosh, IBM PC and compatibles, Amiga, Next, Sun, Hewlett Packard, etc.) or coupled to a serial or parallel port therein. The user controllers can provide multiple input means including, but not limited to, switches, joystick, keyboard, microphone, and other means for user input of stimulus to the system.

The game cartridge 120A is comprised of a storage medium (such as ROM or EPROM or diskette, etc.) which contains the video game software rules, instruction, and data which in conjunction with the video game apparatus 140 provide a video game display presentation and video game play with user responsive input. The adapter interface system is included within the storage card 130 which is coupled via mating connector 131SC to mating connector 131GC to the game cartridge 120A for direct coupling to the game connector bus. This configuration works especially well with games which were created to look for user images in a defined and/or separate address space and to selectively provide for the substitution of selected certain ones of predefined game character imagery segments with respective user visual images. This provides a low cost adapter interface system, but requires that some other external means be utilized to store user visual image data onto the storage card as is described herein. This is a preferred embodiment where the goal is low cost mass merchandising and where other means are provided for users to get user visual images stored as user visual image data onto the Storage Card (e.g., such as the systems of FIGS. 1B, 5A–B, and/or coordinated service-bureau processing for Storage Cards to give users user image data storage.

In accordance with one aspect of the present invention, the adapter interface system 110 provides image integration, controlled via software (either self-contained within the adapter interface 110 or provided by a Game Card 120 or storage card 130) which links image data packets to game software functions and which can then be incorporated into the overall video game audiovisual presentation in combination with a predefined set of complimentary audiovisual imagery segments according to a predefined set of game rules. Game software functions are comprised of, for example (1) facial views: front, side, smile, frown, happy, sad, mad, and mean facial photographs, or a subset or a super set or a different set of these facial photograph views can be used; (2) the user can create his or her own spacecraft, race car, hero, villain, weapon, monster, or other preselected character functions (e.g., icons, sub-image identifier segments), etc.; and/or (3) third party supplied user visual images (e.g., clip art, vendor supplied substitute alternate game character images, etc. Image integration can either be provided for via a universal software package for linking user visual image data to all games of the user created variety (e.g., for multiple cross-platform compatibility), or can be provided in numerous custom tailored software packages for each game or group of games to permit user image data packets to be linked and integrated into the purchased game software (e.g., for vendor-proprietary systems).

Game display functions can optionally include Sub-Image Functions. Sub-Image Functions are any separable portion of the presentation (an element [e.g., arm, torso, face, ear, hand, etc.] of a predefined character image, etc.).

User Image data can represent video, audio, control and other information (such as (1) signal parameter data (for a multitude of purposes such as modeling and rendering, or for alteration of image data, for texture wrapping of a User Video Image onto a predefined character image so as to effectively wrap the user image over the predefined character image); (2) behavioral profile rule data to adjust parameters for behavioral performance of a displayed character image; (3) macro commands for user or adapter interface system control of user image participation in the presentation.

Referring to FIG. 1A and Table I, a non-volatile storage medium 130 (for example a Storage Card [EEPROM or/and RAM], a floppy disk, optical, etc.) stores image data packet (i.e., .IDP) files, and image integration software links the .IDP files from the storage medium 130 for combinational mapping into the application software purchased video game. Thereafter, one or both of real-time play with the resultant combinational mapping and/or storage of .IDP files onto a non-volatile memory subsystem part of (or separate from, but attached) to the game cartridge, so as to create an integral self-contained video game. Alternatively, the separate non-volatile .IDP files can be utilized as part of the game initialization procedure, and .IDP files can be stored in read-write memory (i.e. or EEROM/RAM) so as to be variable from game to game, or can be stored onto Smart Cards, Game Card writable memory, floppy disk, etc., and integrated into the appropriate image files of the game, and either (1) real-time be mapped into game play or (2) automatically be integrated at start up as a part of the game initialization procedure whereafter those .IDP files remain part of the game structure unless and until changed during a future initialization procedure. Alternatively, or additionally, the integration of User Images into the video game can be changed in the middle of a game play, such as by hitting a switch, or as a game award.

TABLE I

MEMORY MAP

| Memory Address Space | |
|---|---|
| ↕ | Video Game Internal ROM (typically 64 KB to 1 MB) |
| ↕ | Video Game Internal Work RAM (typically 64 KB to 1 + MB) |
| ↕ | Video Game Internal Video RAM (typically 64 KB to 1 + MB) |
| ↕ ↕ | Game Cartridge ROM (typically 256 KB to 4 + MB) |
| | Storage Card (typically 64 KB to 1 + MB) |

Memory Address Space is determined by the choice of Video Game Apparatus ("VGA") 140, and usually by the choice of microprocessors and operating software therein. For example, a 32 bit physical address yields 4 Gigabyte (GB) of Address Space. However, the VGA system 140 with attached game cartridge and Storage Card would typically use only from a few hundred kilobytes (KB) to a few megabytes (MB), as shown in the Memory Map illustrated in Table I.

Image data packets consist of image data and headers which identify what type of data they contain, data regarding the height and width of the image, data regarding the amount of data associated with each pixel, data regarding whether the pixel colors are determined by a color look-up table (and, if so, either a pointer to or listing of the color look-up table), data regarding whether the data is compressed (and, if so, necessary information such as the type of compression needed to decompress it), data regarding scaling factor pointers to sound data, and other data normally associated with image data files such as the IFF standard, etc.

A detailed discussion and illustration of the .IDP file format and methodology is provided in the discussion of Tables II and III hereafter.

TABLE II

| ADDRESS 00: | PACKET HEADER | 0 | ID OF USER IMAGE |
| --- | --- | --- | --- |
| | | 1 | DATA RE PACKET STRUCTURE, SIZE, CHECKSUM, ECC CODEWORD, ENCRYPTION, ETC., SINGLE/MULTIPLE UI FLAG, SINGLE/MULTIPLE PCI FLAG, ETC. |
| ADDR02: | UIV SIZE IN BYTES, | | Offset Index Pointer to Start Address <X1> of UI Data |
| 03: | UIV SIZE IN PIXELS | | |
| 04: | ASSOC. PCI DATA | 5 | ID |
| | | 6 | SIZE IN BYTES |
| | | 7 | SIZE IN PIXELS |
| | | 8 | ADDRESSES ON GAME CARD FOR PCI |
| ADDR <X1> USER IMAGE DATA | | | (begins at Address 08 and continues until a delimiter at Address XN). |

Table II illustrates a specific example of a .IDP file format. Addresses 00 to 08 to XN form the .IDP file packet. The illustrated .IDP file packet is broken into fields as follows:

| ADDRESSES | FIELD |
| --- | --- |
| 00 TO 01 | .IDP PACKET HEADER |
| 02 TO 04 | UI HEADER |
| 04 TO 07 | PCI HEADER |
| 08 TO <X0> (as needed) | PCI ADDRESSES ON GAME CARD = ADDRESSES WHICH VGN 140 WILL REQUEST IN ATTEMPT TO GET PCI |
| X1 TO XN | UI DATA |

For multiple User Images, and/or a selection of multiple Predefined Character Images, bit flags are set in memory locations in the Packet Header of the .IDP file stored on the Storage Card. A predefined memory locations serves as a Pointer Register and is loaded with the starting address for the Table multiple mode Table of Contents, as illustrated in Table III.

TABLE III

| MEMORY ADDRESS | MEMORY CONTENTS |
| --- | --- |
| ADDR PR | ZZ |
| ADDR ZZ | # OF UI's, # of PCI's |
| ADDR ZZ + 1 | ADDR 00 for UI #1 |
| ZZ + 2 | ADDR 00 FOR UI #2 |
| ZZ + N | ADDR 00 FOR UI #N |
| ZZ + O | ADDR 05 FOR PCI #1 |
| ZZ + P | ADDR 05 FOR PCI #2 |
| ZZ + E | ADDR 05 FOR PCI #N |

For new Game Card designs, the PCI data is read from the Game Card (e.g., by the VGN or AIS) and is stored in a writable storage area (of the Storage Card or in the AIS 1100).

Many types of image input means can be provided, such as photoscanners, video cameras, video tape player, compact disk, still camera, microphone, etc. Photoscanners can provide .IDP files for two-dimensional photographic text and images. Video cameras can provide input of either live or prerecorded images for conversion and storage as .IDP files. Users can connect the equipment they already have at their home to an adapter interface system which connects to their home video game system and game cartridge, as discussed hereinafter. Special Booths (e.g., see FIGS. 5A–B) having all necessary equipment self-contained could be placed in stores which sell the video game apparatus and game cartridge software, and a fee could be charged. Alternatively a Service Bureau setup (e.g., see FIG. 5) can provide for the mail-in of photographs, VHS tapes, diskettes, etc. wherein a return Storage Card diskette, etc. with the .IDP files on it is sent by mail from one or more centralized mail-in sources. For example, facial views: front, side, smile, frown, happy, sad, mad, and mean facial photographs, or a subset (a super set or a different set) of these set of facial photographs views can be used, and a universal structure can be created for facial related games for each one of the vendor's or for all vendor's by acceptance of a common .IDP standard.

There are numerous video data formatting, compression/expansion, encoding/decoding alternatives that exist, from the well-known and published to the proprietary ones available for purchase/license such as from board manufacturers and game manufacturers. Eastman Kodak has a "PhotoCD" service which permits users to have regular camera film developed and up to 100 photos provided on a compact disk which plays in a regular audio compact disk player, which can be interfaced into a computing system.

In the illustrated embodiment, the structure standardizes on relative offset and location of .IDP files, from the beginning of the .IDP files, such that individual .IDP images can be uniformly selected for the appropriate emotion for integration into the class of "facial" video games, or the appropriate function for integration of the user visual image into a UVI-game. Of course, the present invention extends itself beyond facial views, to heads, full body, hands, or pictures or images of anything.

Additionally, in an alternate embodiment, user voice signals (or voice modeling parameters therefor) are captured, digitized, formatted and stored. A user voice interface system is provided, as a subsystem of the user image system, providing for the input, capture, digitization, storage, and formatting of the user's voice image as a subset of the .IDP file.

A whole new edge is provided to "hooking" people into video games, (figuratively and literally) a rejuvenation from the slump of the 1980's where a threshold was reached with games like Pong, Space Invaders, Pac Man, and Zaxxon. Utilizing the present invention, the human ego is brought to play in the game. Since the user creates player representative characters as well as other functional images for use in the play and/or display of the video game, the game presentation is in fact partially the creation of the user.

The user's image creation system provides player representative character image packets having a predefined file structure, and can be used to determine the functional and structural mapping of the user visual image to the video game and its software functions. In the illustrated example, image data packet files (".IDP") are created for storage in memory and on floppy disk. .IDP files represent a methodology and structure which when uniformly followed allows smooth integration of user created video images into a broad range of different video games, commonly structured to integrate with the .IDP files. For stand-alone applications, many methodology/structures can be selected from to optimize a particular application.

In a preferred embodiment, user visual image data utilization is expanded beyond associative replacement predefined character images and existing game display functions. New game display function can be created specifically to utilize user visual images. For example, user visual images and/or associated sounds can appear as a "newscaster," a "cameo guest, or a "synthetic actor" with predetermined actions (either functional or superfluous) during a video game where there are either none, one or many other user visual images utilized in association with predefined game character and game display functions. In the generalized non-video game audiovisual presentation, icons of user visual and sound images are integrated into predetermined stored audiovisual presentation.

In the preferred embodiment, each video game card 120 includes data stored within its storage memory of the address map table of displayable graphics functions, for use with a character select program which explains and allows substitution of the available player character functions for association with selected image packets.

These image packets can be created via many forms of user image entry, such as by direct user image input by input stimulus devices such as a mouse, light pen, keyboard, joystick, or via a video or still camera, document scanner means, etc. Additionally, entry can be provided by dealer or factory support means as discussed above, or via a communications link such as a modem.

Image data packets can be converted from graphics initially created with any standard graphic, drawing or other creation program (such as "MacPaint," "PC-Draw," "Coral-Draw," Adobe Illustrator Photoshop, modeling programs, CAD/CAM programs, custom or off-the-shelf software including Chartmaster, WordStar, etc.), or can be created via image capture (e.g., video camera originated input, which can be digitized, compressed and encoded).

A conversion utility (software or hardware) can be used to convert from standard graphics formats to the .IDP format and structure.

Game initialization and linkage to image data packets can be accomplished either (1) automatically during startup or real-time during game play, or (2) by execution of the character select program which allows the prospective player to display and select which player character to associate with which game character function. As discussed above, this can be provided automatically as a part of the game initialization, or can be provided as a software utility to initially run before playing the game.

For automatic initialized character selection, the character select program makes a copy and assigns a file name and creates a link table entry, in the master game database, for each association of the user created video image with the game function.

The Storage Card can also provide storage for saving user game scores, parameters of specific games so the user can continue from where the user left off, etc. Also, the Storage Card can provide for system security data storage.

FIG. 1B illustrates the user visual image adapter interface system of FIG. 1A which additionally includes means for user input of user visual images and storage onto a user visual image storage medium in accordance with the present invention.

Referring to the user visual image adapter interface system 110B in FIG. 1B, multiple additional subsystems are present therein beyond that illustrated in the embodiment of FIG. 1A. The adapter interface 110B is coupled via respective connectors 121AIG, 131AI, and 121AIV to the Game Card 120, Storage Card 130, and Video Game Apparatus 140 via respective connectors 121GC, 131SC, and 121VG. These include a video interface subsystem 210 which couples to a video connector 113 adapted for coupling to an external source of analog and/or digital video signal input, such as a video camcorder, video tape player, laser disc player, etc. Additionally, a serial interface subsystem 220 is provided which couples to serial connector 116 which is adapted for coupling to an external serial interface so as to allow for the transfer of image data from an external computer or data storage medium in digital format directly to the adapter interface system 110B for formatting and storage thereby. Game card interface 261, storage card interface 264, video game interface 263 and controller 262 comprise a common base system 260 of the adapter interface 110B, although controller 262 also can be varied for FIGS. 1A versus 1B.

The adapter interface system 110B is adapted for coupling to a video game cartridge 120 and to the video game cartridge connector 121VG of a host video game which includes a display 145. The adapter interface system 110B is comprised of an interface 210 for coupling video source signals from an external video source to the adapter system, a storage medium 130 for selectively storing and selectively outputting user visual image data, a video processing system for converting analog video source signals received from the external video source to a digitized and formatted video information data signal responsive to the rules and instruction data contained in control program storage memory within or associated with the adapter system, where the display of the host video game is responsive to the video information signal to provide an audiovisual presentation representative of a combination of the predefined video imagery segments of the host video game and the external video source based video information signals. Audio input, conversion and integration can additionally be provided.

The adapter interface system 110B is coupled to an external storage medium, such as a Storage Card (e.g., Smart Card or floppy disk), which permits the coupling via external connectors 131SC and 131AI which mate between the adapter interface system 110B and the external storage medium 130, to permit the storage of formatted and mapped image data from the adapter interface system 110B and for storing a table of information regarding the mapping of the image data, as well as identification of which types of image data are present, and where are they mapped into the storage memory of the external storage card 130.

The adapter interface system 110B coordinates the user creation of user visual images, and the downloading of graphic information for utilization via formatting and analysis to permit the transformation of user image information (received through the video interface subsystem coupled to connector 113 and the serial interface subsystem coupled to serial connector 116) to be processed for proper sizing, cropping, and identification (e.g., of poses) such as through interactive communication with the user with sound and visuals using the external monitor and speaker 145 and utilizing the user controller 147 and/or an additional input mechanism to allow user interaction. Alternatively, the adapter interface system provides for automatic processing so as to ultimately provide formatted data for storage on the external storage card 130 which can then later be utilized in conjunction with the video game apparatus 140 and the game cartridge 120 to provide a video game wherein the visual image is integrated into and becomes a part of the game presentation in place of a predefined game character.

Referring to FIG. 1C, an alternate embodiment of FIG. 1A is illustrated, where a storage card interface system 132 is coupled to an I/O port 140 via I/O connectors 141VGS and 141SC, which storage card interface 132 couples to the storage card 130 via mating connectors 131SCI and 131SC. This embodiment has cost advantages relative to the system of FIG. 1A, but has slower relative throughput and data rate. This can be partly compensated for by downloading to RAM in the game cartridge 120C, or in the video game apparatus 140. The advantage of the system of FIG. 1A is that it permits direct coupling to the computer system bus via the game connector so that the storage card 130 can be directly coupled into the memory space of the video game apparatus' 140 CPU and can be utilized within the address space of the video processing system in a manner so as to substitute the user visual images for predefined game character images as appropriate in accordance with the rules and instructions of the game and the protocol and methodology of utilization of user visual images.

An alternative to FIG. 1C, utilizes an existing interface for compact disk ("CD") (or other existing storage interface), such as via an I/O Port, so as to couple User Images from a User Image CD for storage in memory of the Video Game System for use therein. Writable CD technology is adaptable to both a home adapter and a service bureau approach.

Figure 1D:
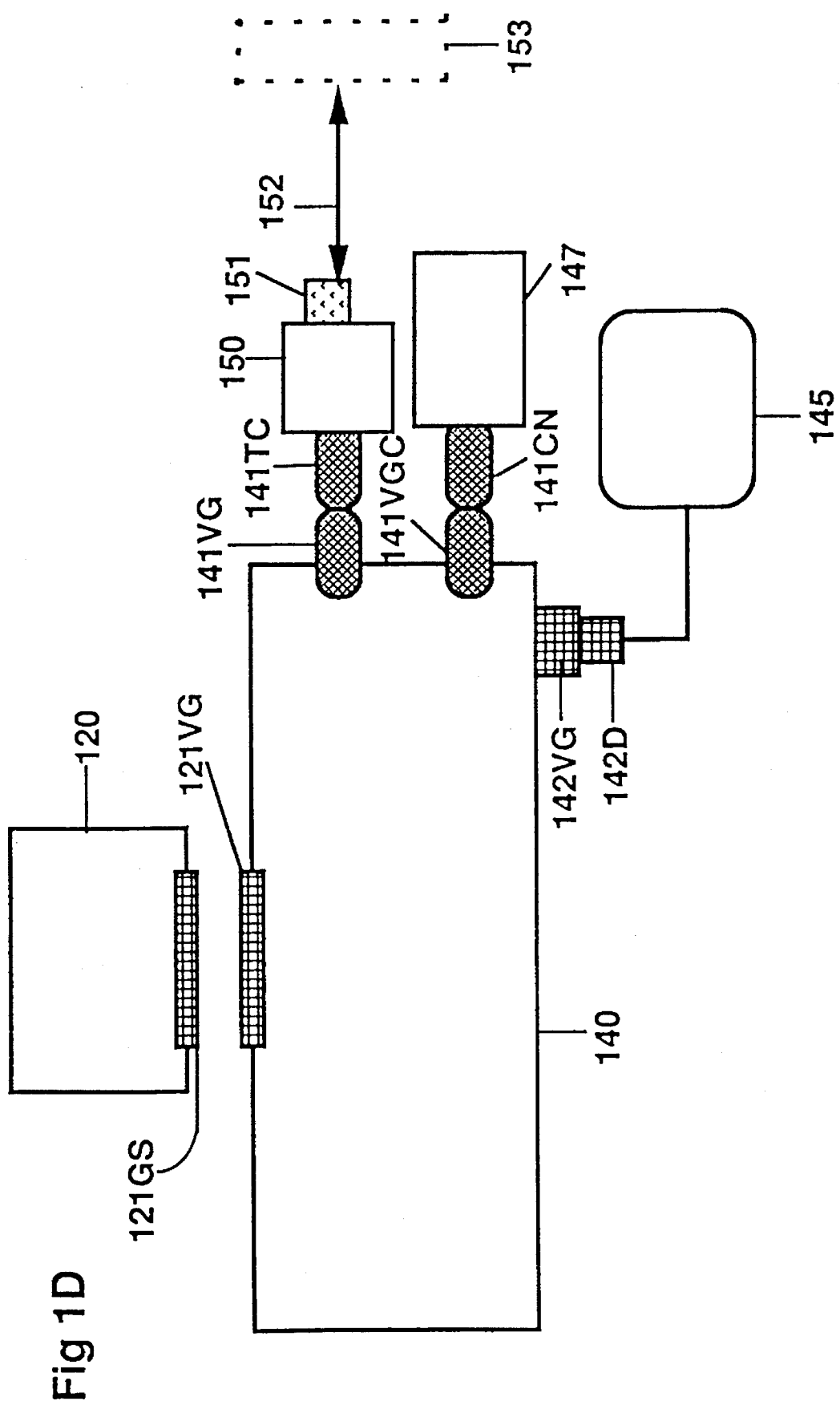
FIG. 1D illustrates a user image adapter interface system providing for the coupling of the user images, as coupled via a communications medium from either an image source or from another video game system in accordance with another aspect of the present invention.

Referring to FIG. 1D, an alternative system of FIG. 1C is provided, where instead of providing an external storage card 130 for coupling to the video game apparatus (via the I/O port or via the game connector bus (either via an interface adapter system or via a Storage Card), the adapter interface system of FIG. 1D provides a telecommunications link 150 which couples via mating connector 151 to an appropriate communications bus or gateway 152, (such as a phone line, modem connection or higher speed protocol) and data is loaded from a remote data source via the telecom link 151 to the video game apparatus 140 for storage in memory either in the video game apparatus 140 or on the game cartridge 120, which memory is read write RAM or EEPROM which permits the user images to be used during the play and display of the video game. Nonvolatile read write memory permits longer term storage of those user visual images in the game card so that they don't need to be reloaded in the future unless changed. The telecom link 150 can be coupled to I/O port connector 141VG via connector 141TC, or can alternatively be coupled to a connector on the game cartridge 120 (as in FIG. 1A in place of the storage card 130), or can be coupled to storage card connector 131AI of the adapter interface system 110 of FIG. 1B. The telecom link 150 can be used with the systems of FIGS. 1A–C, as an added feature. A compact disk player and interface or other local storage can alternatively be coupled to the adapter interface system of FIG. 1D, in place of the telecom link 150 which couples to a remote data storage source.

In a preferred embodiment as illustrated in FIG. 1E, for new user image game designs, the game card 120A contains logic 125 to automatically map user visual images into the memory space of the game card 120A. When the Storage Card 130 is connected via connectors 131SC and 131GC to the game card 120, the user images data sets (.IDP files) contained on the Storage Card are mapped into the appropriate memory space of the game cartridge, so as to override the selected or default predefined character images. The game cartridge 120 will play either with or without the Storage Card 130 attached thereto. This is preferably done in a manner transparent to the microprocessor of the video game apparatus, using decode logic in the Storage Card 130 or game cartridge 120A.

Figure 1F:
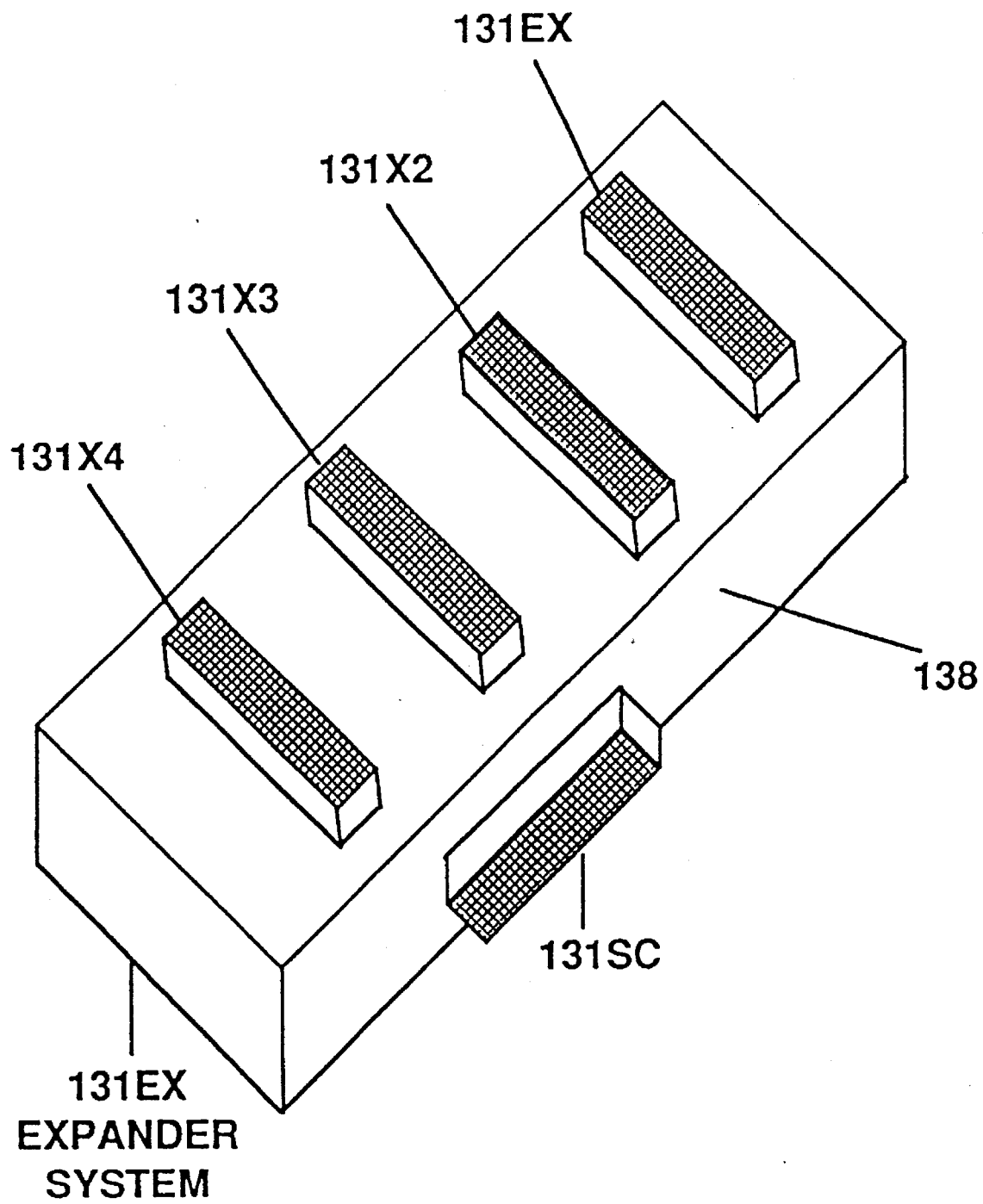
FIG. 1F illustrates an expander system for permitting multiple storage cards to be coupled to a single video game system, in accordance with the present invention.

Referring to FIG. 1F, expander system 131EX permits multiple users to each and all simultaneously couple their individual storage cards 130 to the video game system 140, so as to permit each user to have a respective user image associated with a respective different predefined character image or game display function or audiovisual presentation icon. The storage card connector 131SC is adapted to couple to the storage connector for coupling the storage card into the video game system (e.g., 131GC of FIG. 1A, 131AI of FIG. 1B). Interface and buffer circuitry 138 buffer and expand the connector interface from one to four, and simultaneously couples the storage cards into the video game system. Interface subsystem 138 also provides additional address selection so as to permit the video game system to separately identify and utilize each of the multiple storage cards and the users images stored thereon.

Multiple storage cards, each with user visual images for a different user, can be coupled to the video game system for user therein. For games where multiple users will be providing storage cards with user visual images, the connector 131 provides multiple connectors allowing multiple storage cards to be interconnected thereto. The video game system detects those games allowing multiple user visual images therein, for multiple players, and additional detects when multiple user visual image storage cards are present, and sets a flag in memory indicating multiple user visual image cards are present, thereby enabling multiple sets of tables of pointers for game display function and image data starting address, one set each for each player having a user visual image storage card.

Figure 1G:
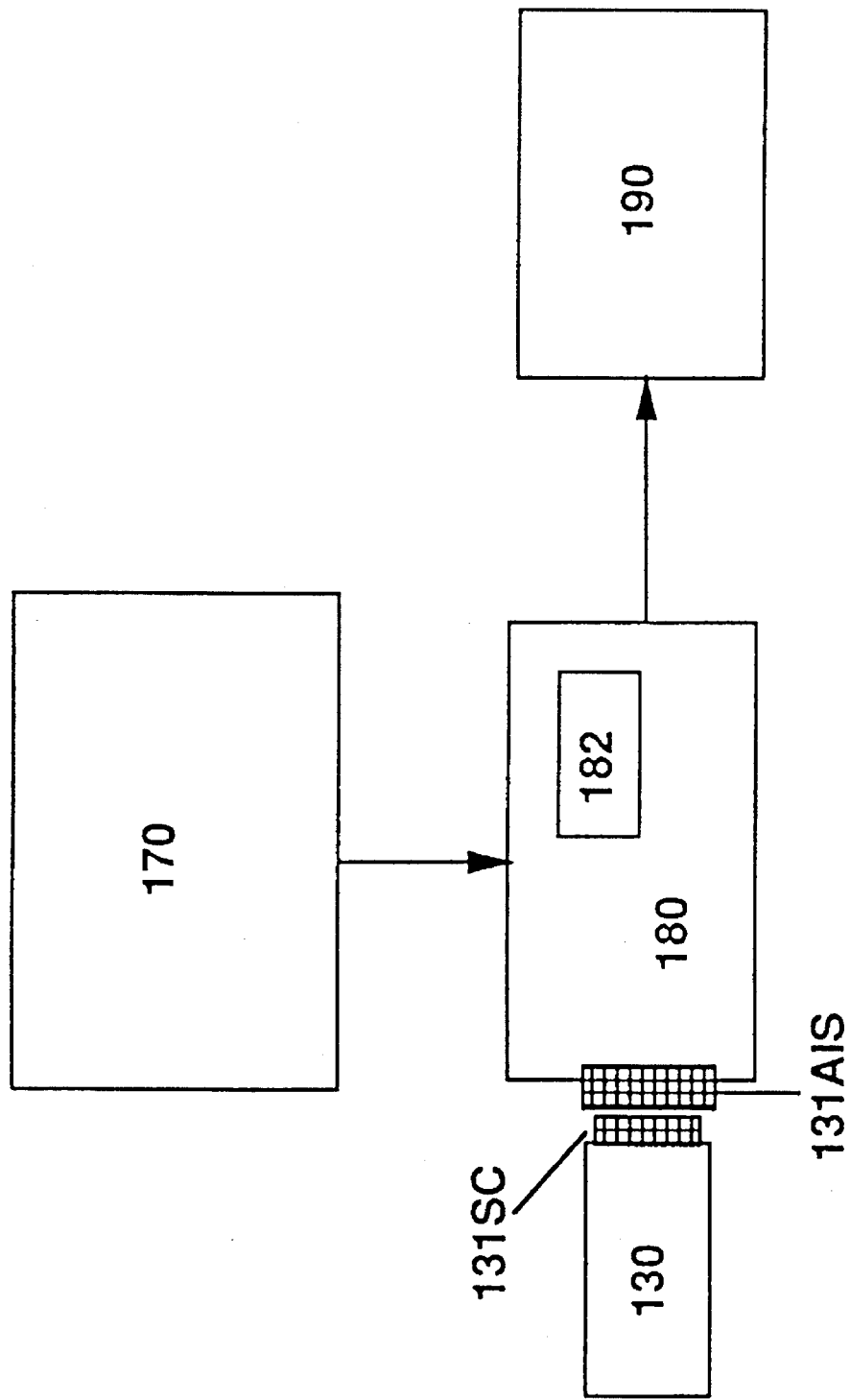
FIG. 1G illustrates a general purpose adapter interface system for use with any audiovisual source, in accordance with the present invention.

Referring to FIG. 1G, audiovisual image source 170 provides an audiovisual presentation output such as video (video cassette record, cable or broadcast television, laser disk, audiovisual, digital video tape, formatted image data [e.g., PICT]), audio tape or disk, which output is coupled to a display 190. Adapter interface system 180 analyzes the output of the image source 170 and identifies and intercepts selected predefined character images of the audiovisual presentation, substituting a user image from the storage card 130 coupled via storage card connector 131SC from the storage card 130 to connector 131AIS to the adapter interface system 180, or otherwise modifying the associated presentation, and provides and audiovisual output to drive a presentation display/speaker 190. The adapter interface system 180 is further comprised of video processor 182 which provides digitization, formatting and other processing as necessary to permit analysis of the audiovisual image source 170 output.

In a preferred embodiment, the adapter interface 180 couples black box style to one or more storage cards and to a video monitor and a video source. The adapter interface system 180 can be stand-alone or an attachment coupled to a video game system or a computer system. This permits user image integration into any source of audiovisual presentation.

Referring to FIG. 2A, there is illustrated an internal block diagram of an adapter interface system 110 for use with FIG. 1B where video interface 210 and serial interface 220 are not utilized, but otherwise corresponding functionally to FIG. 1A. The game connector 121VG from the video game apparatus 140 is coupled via connector 121AIV to the main control system 260 which provides storage card interface, game card interface and video game apparatus interface responsive to control logic 250 which responsive to signals from the game connector bus 121, and from the game cartridge 120 and game apparatus 140. In accordance with the rules and instructions contained in a read only memory 230 and utilizing a read-write memory 240, for a processor-based logic 250 the control system 260 controls all aspects of user image programming and interface, both during an initialization mode and ongoing throughout the game, coordinating the addressing of the game cartridge and storage card and coordinating the utilization of user visual image data as appropriate to provide a video game system having an audiovisual presentation containing the user image.

Referring to FIG. 2B, an adapter interface system 110C corresponding to the adapter interface system 110B of FIGS. 1B and 1C is illustrated, wherein the control circuit 260 of FIG. 2A is still present providing functional equivalence, except that additionally the control and coordination of capture and formatting of user visual image data is performed by the adapter interface system 110B of FIG. 2B. The interface adapter system 110C includes a video subsystem 210 coupled to the video connector 113 for receiving analog video input from an external video source. The video subsystem 210 provides for video signal interface, capture, digitization, and formatting as user visual image data responsive to the controller 260, for storage on an external storage medium via the storage card connector 131. The output from the video subsystem 210 is a digitized video data output converted from the analog video input received from the external video source. Interface connector 213 is provided to allow direct input of digital video input from an external source, whereby the video signal interface capture and digitization of analog signals section of video subsystem 210 is no longer required. Analog video in and/or digital video in can be coupled to the video subsystem 210, depending on the desired application. However, for cost efficiency and compatibility with most home users, an analog video input is probably adequate, and most cost-effective. The interface system 110 is also comprised of a serial interface subsystem 220 which couples to the serial connector 116 for coupling to external serial interface such as RS232, RS244, etc. Serial interface 220 provides for UART, clocking, buffering, and simple control logic, to provide a digitized video data output 221 from the serial interface 220, which is coupled to the controller 260 for appropriate formatting and storage on an external storage medium of user visual image data.

The controller circuitry 260 is coupled to the game cartridge connectors 121 for coupling to the video game apparatus 140 and separately coupling to the game cartridge 120. Additionally, the controller circuit 260 is coupled to the Storage Card connector and/or optionally the I/O port connector where the storage card is coupled via an interface adapted for coupling via the I/O port connector. Certain signals, such as power signals can be directly coupled from one game connector 121 to the other game connector 121, so as to couple certain signals like power directly from the video game apparatus game connector to the game cartridge game connector. These signals are also coupled to the control circuit 260, for selective coupling to the Storage Card 130 via the storage card connector 131 coupled to the controller circuit 260. Alternatively, where the storage card is coupled via the I/O port, coupling of signals is via the I/O port connector. The remaining signals from the video game apparatus are coupled via the game connector 121 to the controller circuit 260 and are selectively interfaced to and from either the storage card 130 via connectors 131SC and 131AI to the external storage medium 130 or via the cartridge connectors 121AIG and 121GC to the game cartridge 120. The controller circuit 260 provides for coordination of access to the storage card 130 for utilization of user visual image data in accordance with the present invention.

The controller 260, in the intercept embodiment, in addition to those elements as described above with references to FIGS. 2A and 2B, also provides, intercept logic functioning, as discussed elsewhere herein, such that the adapter interface system 110I additionally provides the intercept function, whereby non-user-image designed games can be utilized with user visual image data, whereby the adapter interface system 110I selectively substitutes for certain game software character image data with user visual image data for predefined character image data so as to provide a video game including the user visual image in the video presentation thereof. As discussed in greater detail hereinafter, the intercept function analyzes the signals to determine when it's appropriate to make substitutions of user visual image data for predefined game character data.

Figure 3:
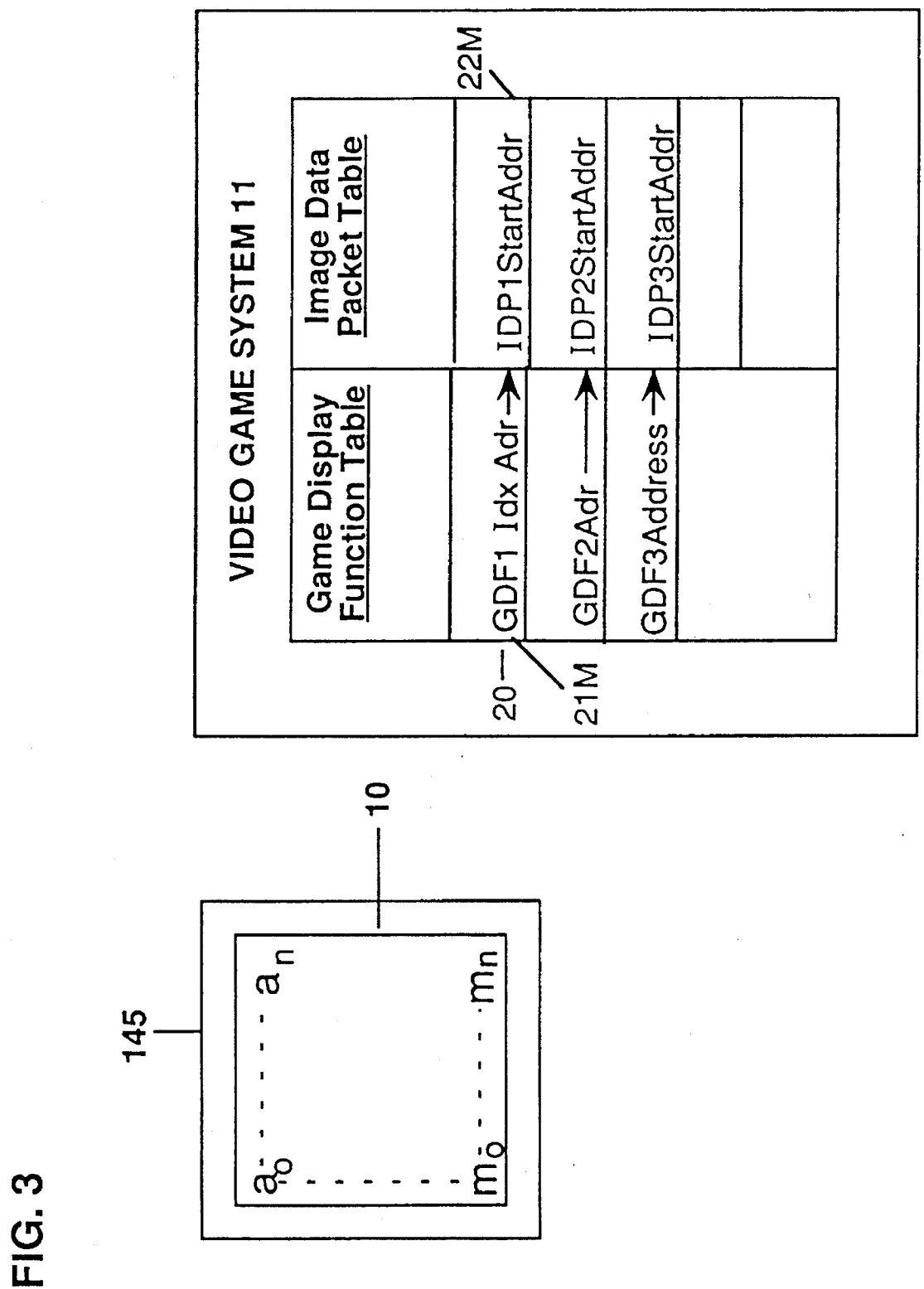
FIG. 3 illustrates a presentation display mapping to logical and physical memory mapping diagram in accordance with the present invention.

FIG. 3 illustrates a presentation display to logical and physical memory mapping diagram in accordance with the present invention.

In accordance with one aspect of the present invention, the user image creation system creates a mappable absolute or virtual link of the user defined images and sounds and related parameters for integration into other graphics and game software packages, such as where the user defined or created visual or audio images or parameters therefor are utilized in the audio-video presentation of the video game as one or more of the preselected character imagery segment(s) or sounds associated with the user's play of the game or as a particular character or other video game or software function in the game (e.g., hero, villain, culprit, etc.) and/or a particular portion and/or perspective view of a particular character, such that one or more of the user visual images and/or sounds is incorporated into the audiovisual presentation of the resulting video game. A virtually mappable link of the user defined images is game independent so that it can be mapped in a relocatable manner to fit into any address space mapping compatible with the video game to which it is being linked. In addition, the virtually mappable link permits adaptation of the user defined image data to any formatting structure for a particular game. Where a class of games is created with a uniform format and mapping, then an absolute mappable link of the user defined image can be utilized with games.

Most video games are designed with character-based video presentation display such as display 10 on monitor 145, comprised of multiple rows (a to m) of multiple characters ($a_o$ to $a_n$, to, $m_o$ to $m_n$) each. (For example, the Sega Genesis utilizes 28 rows of 40 characters each, where each character is 8×8 pixels.) A predefined character image is a graphic which is comprised of one or more characters which is associated with a video game display function.

For example, a predefined character image may be comprised of display characters $a_0$ to $a_c$, $b_0$ to $b_c$, and $c_0$ to $c_1$, which are associated with a game display function present in the audiovisual presentation 10. A Game Display Function index table in memory 20 indexes (addressed by the game display function) to Image Data Packet Index Table memory 30 which contains corresponding information comprising the proper memory starting address pointer. Mapping data can relatively define the image characters or can define the relative position of the predefined character image. Memory 20 either within the video system 11, can be distributed physically as desired, preferably within VGA 110 or Storage Card 130, or both.

FIG. 3 illustrates an alternative correlation and mapping of multiple Game Display Functions ("GDF"), as discussed with reference to Tables II and III.

When a selected GDF is requested from the Game Card 120 by the VGN140, the AIS110 intercepts the request and accesses the GDF Table 21M. Each GDF number (e.g., GDF #1, GDF #2) has a memory location serving as a pointer to an entry address for an associated User Image .IDP in the .IDP Pointer Table 22M (e.g., IDP#1, IDP#2). The Pointer Tables 21M and 22M need not be physically or logically contiguous, and can both be in the same physical memory 20 or can be physically distributed in separate physical memories.

The .IDP Table 22M entry address is a pointer to the ADDRØØ for the respective User Image .IDP file.

The video game software provides a default set of initialization values for the Table of Pointers by Game Function and in the Table of Pointers to Image Data Packets.

When a storage card containing a user image is present in the video game system, then the video game system updates the video game tables of pointers, (wherever distributed physically [e.g., utilizing the game card memory, the storage card memory, the adapter interface memory or the video game apparatus memory]), either automatically or by user selection process, to identify and associate user image data with a predefined game character or game display function, providing a pointer to the storage card address where the respective user image and/or parameter data storage begins. In a preferred embodiment, if the storage card is coupled to the video game system at power-up or on restart, the storage card loads its set of initialization values into the Tables for Game Display Function Pointer and Image Data Packet Pointer.

A predefined protocol for image data packets (e.g., starting address, size of packet, then number of bytes of image data, number of bytes of mapping data, scaling factor, etc.) permits variable size images.

User images can be mapped to a unique exclusive address space (reserved), so that the video game system addresses selected active user visual images for the respective desired game display function.

Alternatively, selected active user images can be mapped to a coincidental address space to supersede (and replace) respective image data for respective game display functions, in a manner similar to shadow RAM superseding and replacing its associated ROM address space.

The pointer table memory can be contained within the storage card, video game apparatus or game cartridge. The game cartridge's having this memory would add a recurring expense for every user visual image class of game cartridge, whereas the other approaches result in a one-time fixed cost, making them preferable at the present. However, as technology costs go down, EEPROM (and other) technology for game cartridge memory may make it desirable to place the pointer table memory in the game cartridge. Alternatively, image memory can be provided in the storage card 130, game card 120, or within the video game apparatus 140. This image memory is filled such as upon game initialization, with either the default predefined character images or with the associated user image.

Where there are multiple planes of graphics utilized in constructing the video and audiovisual presentation, such as sprite planes, the user visual image can be utilized in constructing sprite planes. Sprites are well known and utilized in the video game field, including in the aforementioned example of the Sega Genesis, and many other video games and early home computers. For example, Texas Instruments, Inc. has a part, TMS9918 sprite graphic chip, and there are numerous sprite graphic and plane layered graphic chips available which could be utilized in conjunction with commercially available computing systems ranging from microprocessors to computers (personal to large).

In accordance with another aspect of the present invention, the user visual image is constructed of signal parameter information regarding synthesizing or modifying either or both of the video or audio signal, which is then utilized to adapt the predefined character image or audio sound track associated with interactive video game display presentation and game play, such that user visual image data can consist of one or more of video image information, audio information, or signal parameter data relating to either video or audio or other control of signals or data, such that the actual integration of the user image into the video game can affect or be affected by one or more of backgrounds, environment, facial feature combination or modification of predefined and user visual image data, user voice data, special graphics and audio data, etc.

It is to be understood that user visual image data is not restricted to video data alone, nor to user provided data alone in the sense that the user can obtain graphics and image data from third party suppliers, including the manufacturer of the particular game cartridge and/or of the video game apparatus. However, any person or system can provide the storage card and couple the storage card to the video game system to effect the user visual image in video game.

As mentioned elsewhere herein, technology from virtual reality can be integrated into the present invention very well, in many ways. For example, there are three dimensional input apparatus and display and modeling hardware and software which permit user movement, from hand movement to facial movement, to be accurately tracked and input as coordinate parameter data in a multidimensional version of a joystick. Furthermore, technologies exist to permit scanned movement and even physiologically based input of image data, such as by x-ray, infrared, sonar, audio, ultrasonic, etc. For example, a user of a video game can totally interact with and control input to the video game via non-invasive biological signal monitoring ranging from measuring a characteristic of skin impedance (e.g., resistance capacitance) to brain wave, heartbeat, body temperature, etc. Thus, a user can utilize biofeedback to control pulse rate to keep energy levels higher in the video game. The higher the user's pulse rate, the faster the user burns energy and the faster the user must regain energy by earning it or finding it within the context of the video game rules.

Additionally, inputting user voice data (ranging from predefined spoken words contained on the user storage card to user voice signal parameter data for use by a speech synthesizer) for association to user's visual image data based to interject the user's voice into the video game. Methods of integrating user audio images into the presentation include simple direct feedback (e.g., when the user pushes a button and fires a weapon, a confirmation report is spoken in the user's voice such as "photon torpedo fired" or "blue squadron launched"), a particular predefined character image within the video game presentation can, when speaking, utilize the voice signal parameter data to model a voice synthesizer in accordance with the user visual image data voice sound parameter data effect the integration of the user's voice into the audio portion of the presentation associated with the predefined character image, etc. Thus, for this example, the predefined character image speaks so as to sound like the user. Instead of sounding like the user, the voice signal parameter data can be for any other voice, or modification of user's or other voice or other sound or a combination thereof, so as to permit the utilization, of famous (under appropriate license), or other voices or sounds in place of the predefined character default voice associated with the video game software contained on the game card (as the system would operate if no storage card were installed).

FIG. 4A illustrates the block diagram and data logic flow diagram of the Intercept Adapter Interface System compatible for use within the Adapter Interface System of FIGS. 2A and 2B, in accordance with the present invention. An intercept controller embodiment of an adapter interface system 110E is coupled to a game cartridge 120, Storage Card (S/C) 130, and a video game apparatus 140. The video game apparatus is coupled to an external display monitor 145 and to user controls 147. The intercept controller adapter interface system 110E receives address signals 211 and control signals 213 from the video game apparatus 140 and selectively couples these signals to the game cartridge 120 and Storage Card 130 via respective Game Card address and control signals 222 and Storage Card address and control signals 232. The Game Cartridge 120 or Storage Card 130 responds to the respective address and control signals to provide either game card image data out 224 or Storage Card image data out 234 for coupling to the intercept controller adapter interface system 110E which provides a "video game data in" output 214 for coupling to the video game apparatus 140.

Figure 4B:
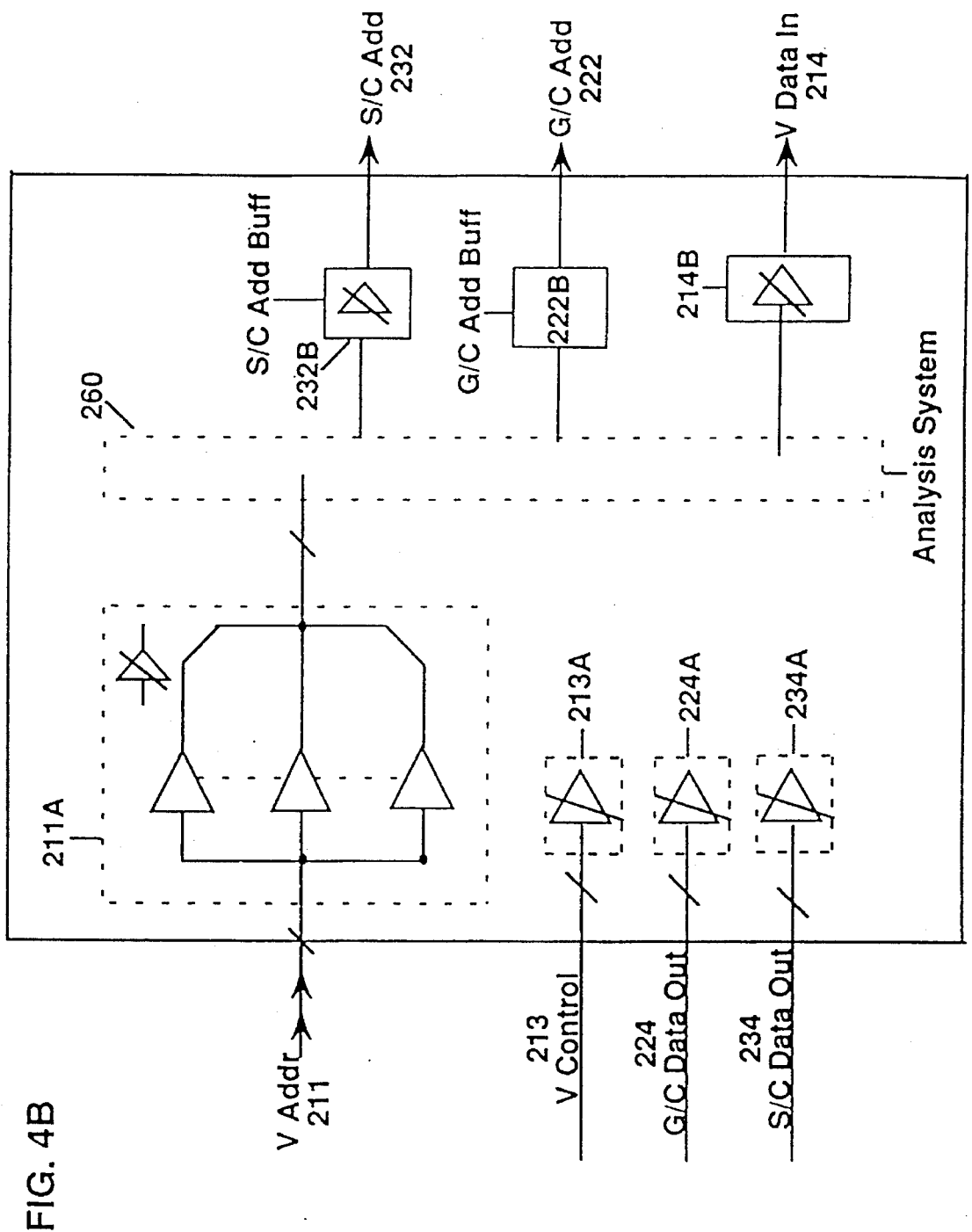
FIG. 4B is a detailed block diagram of the adapter interface system of FIG. 3A.

Referring to FIG. 4B, a more detailed block diagram of the intercept controller adapter interface system 110 is shown, comprising input buffers 211A, 213A, 224A and 234A, which respectively buffer the video game address signals 211, video game control signals 213, the game cartridge data out signals 224, and the Storage Card data output signals 234, for coupling of the respective signals to the analysis system 260 of the intercept controller adapter interface system 110E, which selectively provides address output 222 to the Game Card 120 and address output 232 to the Storage Card 130 for output respectively, to the game cartridge 120 or Storage Card 130, responsive to the analysis system 260 determination and selection of proper address output. The Storage Card address buffers 232B couple the Storage Card address signals 232 to the Storage Card 130. The Game Card address buffers 222B couple the Game Card address signals 222 to the Game Card 120, as selectively determined and controlled by the analysis system 260. The Game Card 120, as appropriate, responds by providing predefined character Game Card image data output 224 to the Analysis System 260. The Storage Card 130 responds, as appropriate, by providing User Image Storage Card data output 234 to the Analysis System 260.

The output buffer 214B selectively couples data as provided by the analysis system 260 to the video game data in signals 214 to the video game apparatus, responsive to a determination and analysis by the analysis system 260 as to whether the Game Card data out signal 224 or the Storage Card data out signal 234 is the proper signal for coupling to the video game apparatus as the data input Video Game Image input 214 coupled to video game apparatus 140.

The analysis system 260, in conjunction with the remainder of the intercept controller adapter interface system 110E, provides for substitution of the user's image for the predefined game character image in a manner transparent to the original video game apparatus and the original game cartridge. Thus, existing video game hardware and game cartridges can be re-utilized to expand the horizons of possibilities of modifications and play of the games. Updates can be provided with new predefined graphics provided by the manufacturer of the game apparatus and software via a Storage Card. Sets of "canned" user visual and audio images can be provided by third parties (via the Storage Card).

There are numerous ways to implement the analysis system 260. For example, address and/or control and/or data signal analysis, timing analysis, state analysis, signature analysis, or other transform or analysis techniques can be utilized to identify when particular predefined player graphic character segments are being accessed and transferred to the video game apparatus 140 read-write memory from the game card 120, and at the appropriate time, instead of accessing the Storage Card 130 and transferring data out 234 from the Storage Card via the intercept controller 110 for coupling via the video game data signals in 214 to the video game apparatus 140. The substitution of user visual images is preferably automatic upon detection of Storage Card 130 being installed in the system, but can also be manually activated. For newer game cartridges designed with a link feature, the user can actually make selections and set up control when the Storage Card 130 is installed, via the user controls 147.

In a preferred embodiment, for each game, it is possible to provide a mapped set of addresses associated with image data for predefined character image segments for that game, and to store those addresses as a table in memory, (preferably within the Storage Card 130 or in memory in the adapter interface system 110 or in the video game apparatus 140. The look up table function can be provided utilizing ROM, RAM, EPROM, PLA, EEPROM or through discrete logic. The addition of a finite state machine, microcomputer, or digital signal processor permits the addition of many functions, and can provide intelligent initialization and start up. However, in the simplest mode, where only decode is needed, the processor from the video game apparatus 40 can be utilized by the adapter interface system intercept controller 110. Alternatively, a separate Storage Card could be provided which contained the mapped set for one or more particular game cartridges, and then a Storage Card 130 containing user visual images could be inserted upon prompting via the display monitor 45. Where it is not possible to obtain mapped set address information from review of the software listing, or from the game designer, it is also possible with analysis techniques to determine a signature analysis technique based on the control signals and/or the video address signals output from the video game apparatus 40 and/or the game card data out signals output from the game card 120.

In conjunction with another aspect of the present invention, the intercept controller contains a storage table containing the necessary signatures needed to perform the signature analysis for address and/or data flow analysis, state analysis and/or timing analysis or a combination of those and/or other techniques, which are accessed by an initialization program for the video game apparatus which either automatically identifies or which allows the user to identify, via the user control 147 and the display monitor 145, which game cartridge game software package is being utilized. The intercept controller 110 is then properly initialized from its stored table of signatures, to appropriately intercept certain predefined character imagery segment access requests by the video game apparatus and to cause the substitution of the user images from the Storage Card 130 into the video game apparatus 140 data so that a video game presentation displayed on monitor 145 by the video game 140 is responsive to the user controls 147 and to the rules and instructions contained in the Game Card 120 software cartridge and to the user visual images integrated in from the Storage Card 130. Analysis means 260 recognizes those signatures of the selected certain predefined character images, and provides certain signals (e.g., address and control signals) to obtain a user visual image. Obviously, when the Game Card 120 is addressed and accessed, then the game cartridge data 224 is coupled via the controller 110 to the video game apparatus 40 for use therein, for non-user visual images' associated addresses.

The method in accordance with the present invention of utilizing user image data in the audiovisual presentation of the video game, is also extendible and applicable to any digitized audiovisual presentation. The method provides for analysis identification of a predefined image character within the presentation by analysis of signals associated therewith, and association of the predefined image with a user image such that the user image is integrated into the presentation in place of the selected predefined image. Thus, the Intercept Adapter Interface System ("IAIS") of the present invention is valuable in applications that extend beyond computer based video games to include User Image integration into any digitized or computer generated video or animation presentation. Examples include (1) interactive cartoons at home (e.g., IAIS is coupled to the home VCR and TV); (2) interactive animations or digitized video (live or recorded) e.g., such as visitors to Disneyland receiving a User Image Storage Card at entry. The Storage Card is used at each exhibition or attraction. As the user goes through the exhibit, he/she inserts his/her card into a connector and thereafter "participates" in the display presentation; (3) a service bureau could permit "you" to star in your own movie by integrating in "your User Image," and mailing the integrated movie back to "you."

Figure 4C:
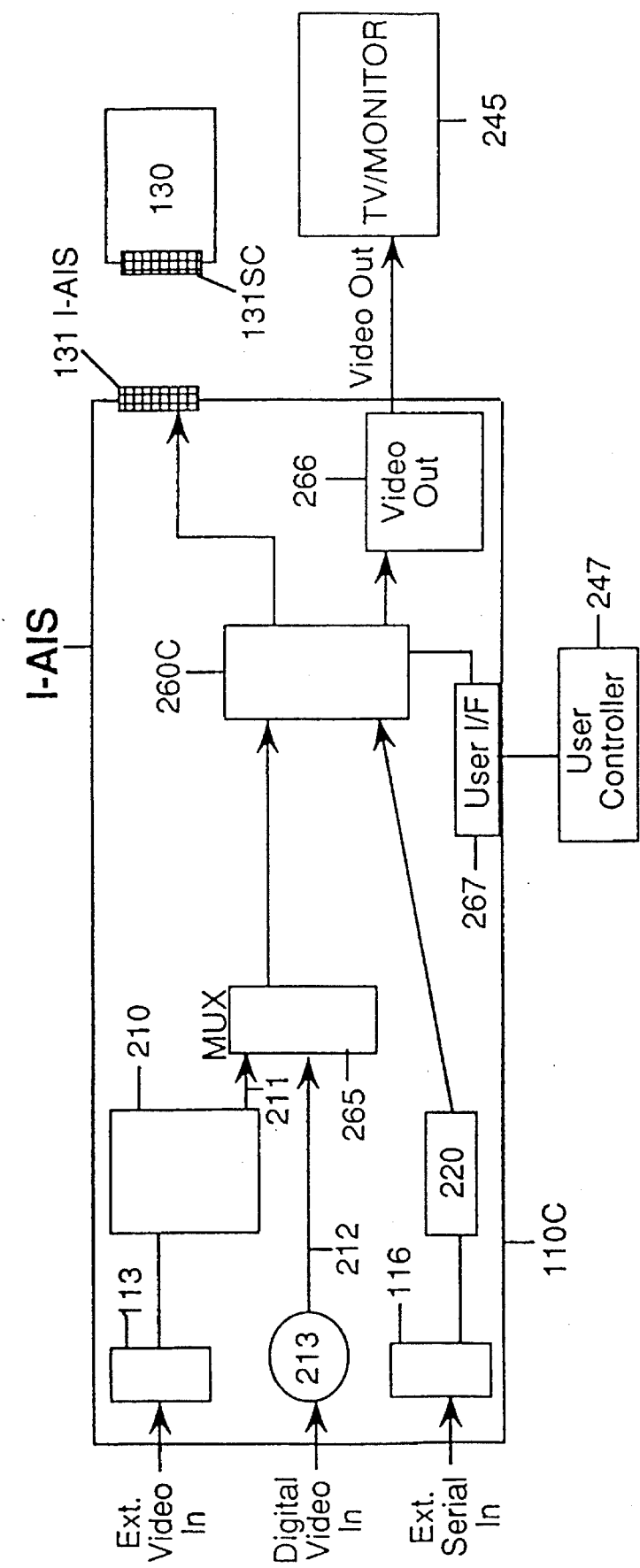
FIG. 4C is a flow diagram of the intercept function of the adapter interface system 110E of FIG. 4A.

Referring to FIG. 4C, an intercept adapter interface system 110C, having subsystem components (113, 210, 213, 116, and 220) is illustrated, wherein the control circuit 260C provides functional equivalence, to control circuit 260 and additionally controls and coordinates the capture and formatting of user image data. The interface adapter system 110C includes a video subsystem 210 coupled to the video connector 113 for receiving analog video input from an external video source. The video subsystem 210 provides for video signal interface, capture, digitization, and formatting as user visual image data responsive to the controller 260C, for storage on an external storage medium via the storage card connector 131. The output from the video subsystem 210 is a digitized video data output 211 converted from the analog video input received from the external video source which is coupled to multiplexer 265 which has its output coupled to controller 260. Interface connector 213 is coupled to allow direct input of digital video input 212 from an external source which is coupled to multiplexer 265 which has its output coupled to controller 260. Analog video in and/or digital video in can be coupled to the subsystem 110C, depending on the desired application. However, for cost efficiency and compatibility with most home users, an analog video input is probably adequate, and most cost-effective. The interface system 110C is also comprised of a serial interface subsystem 220 which couples to the serial connector 116 for coupling to external serial interface such as RS232, RS244, etc. Serial interface 220 provides for UART, clocking, buffering, and simple control logic, to provide a digitized video data output 221 from the serial interface 220, which is coupled to the controller 260C for appropriate formatting and storage on an external storage medium of user image data.

Controller circuit 260C is coupled to the Storage Card 130 via connectors 131IAIS and 131SC and to the user interface 267 is coupled to a user controller 247 providing signals responsive to user activated input stimulus.

The controller 260C also provides intercept logic functioning as discussed elsewhere herein such that the adapter interface system 110C additionally provides the intercept function, whereby the adapter interface system 110C selectively substitutes user image data for predefined character image data so as to provide an audiovisual presentation which includes the image integrated therein. The intercept function analyzes the signals to determine when it's appropriate to make substitutions of user image data for predefined game character data.

For video game systems, the analysis of the digitized presentation data and transformation into a user visual image modified presentation must be performed in near realtime or realtime, such that the user selected image is tracked and the associated user image is substituted therefor or otherwise utilized. If suddenly a large displacement occurs the display of the entire display presentation is scanned to detect the selected image. Small displacements are tracked and predicted by extrapolation and history. For video graphics signal (e.g., movies, animation, etc.), which have been digitized, the analysis and transformation can be performed in less than realtime (such as processing of an animation to include user images in addition to or in place of preexisting defined characters). If more user images are to be associatively integrated are provided than normal predefined image characters which can be associated therewith exist, the system is capable of creating "extras" (in the acting sense) of additional predefined character images, associatively linked to one or more normal predefined images, to permit large numbers of user images to be incorporated into the display presentation of the processed video. Thus, animations, such as cartoons, and even movies, can be user visual image and/or sound image integrated in accordance with the teachings of the present invention, in a manner transparent to the original source of the video display presentation.

Technology exists today to do this, although the cost of existing systems at the present is still expensive relative to the cost of a home video game system. However, for amusement parks, arcades, circuses, movie companies, etc., the technology is within the budget of an affordable and profitable project. It is anticipated that in the near future, the cost of the technology will be greatly reduced down to the cost where a block adapter box can be hooked between the television and the video source, and in conjunction with a home video game system or a personal computer, or an adapter interface box controller, the user can provide user visual image integration into any audiovideo presentation. Broadcast programming and prerecorded programs can be modified, either delayed for processing or processed on the fly as output, to provide an audiovisual presentation wherein the user image data is integrated and forms a part of the audiovideo presentation, as, or associated with, a predefined character image.

Examples of technology utilized today which is adaptable and has equivalents available for application to the present invention include the technology used in colorizing movies and cartoons for the movie film industry, and the technology of digital editing suites used by Video Production studios and services. Examples of Video Production Studio equipment include those from Grass Valley which makes switchers, Ultamatte, video distribution amplifier and Video Digital Video Disk Recorder, as well as technology for Texture Wrapping by a "Deviation" product by Pinnacle, Inc., in Illinois. Additionally, many currently available video processing boards (including such boards as those from the following U.S companies: Raster Ops, Intelligent Resources Integrated Systems, Inc. [IRIS], TrueVision, Nutek, Grass-Valley, Tektronix, Hewlett Packard, IBM, etc.), can be adapted and utilized, or their equivalents, to provide the necessary technology to implement this aspect of the present invention.

Figure 4D:
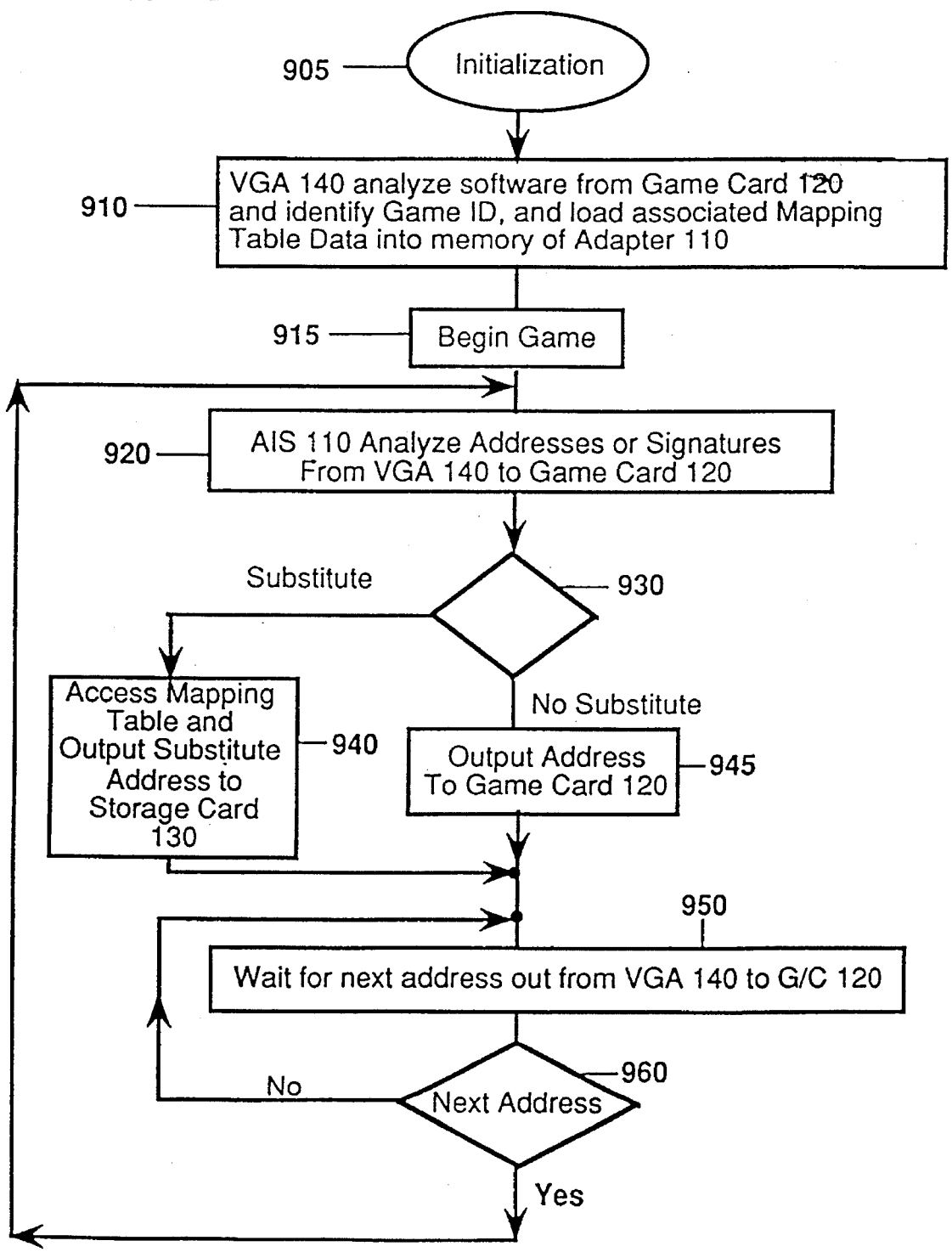
FIG. 4D illustrates a flow diagram of the intercept function of the adaptor interface 110E of FIG. 4A.

The integration of the user created image data into the video game system architecture can be structured in a number of ways. Referring to FIG. 4D, a flow diagram of the intercept function of the adapter interface system 110E of FIG. 4A is illustrated. In the preferred embodiment illustrated relative to FIG. 4D, the user visual image data is integrated into the video game (Step 905:) upon initialization (e.g., restart or power-up) (Step 910:), by the video game apparatus 140 analyzing the video game software from Game Card 120 which provides a key as to its identity, which is utilized by the video game apparatus processor to permit the loading of a mapping table within the adapter interface system 110 (or Game Card 120 or Storage Card 130) so as to permit direct interception and substitution of predefined character images with user visual image addresses with corresponding user visual images. The game cartridge 120 can also be provided with the capability to deselect itself for addresses which have been enabled on the Storage Card 130 for other embodiments. Alternatively, the video game image data can be stored in the video game apparatus 140, and user visual image data can simply overwrite the corresponding predefined game character data which it is to replace. Once (Step 915:) the video game begins, and (Step 920:) the Adapter Interface System 110 analyzes signals from the VGA140 meant to address the game card 120. (Step 930:) A decision is made as to whether the address request to the Game Card 120 is one of those associated with a predefined character image from the Mapping Table Data as stored in the memory of AIS110 so as to require a substitution. Step 940: If a substitution is to be made, then the AIS110 accesses the mapping table and outputs a substitute address to the storage card 130, coordinating complete transfer control of all address and data transfers needed to substitute the user image data for the predefined character image data.

(Step 945:) If no substitution is to be made, then the address from VGA140 associated with the predefined character image is coupled to the game card 120 from the adapter interface system AIS110.

(Step 950:) After an address is output to the storage card 130 (Step 940) or output to the game card 120 (Step 945), the next step (Step 950) is the wait for the next address output from the VGA140 to the game card 120 associated with a predefined character image from the mapping table data as stored in the memory of AIS110.

(Step 960:) A decision is made by the AIS110 as to whether the next address is one that is associated with the predefined character image to be associated with the user image. If so, indicated yes in FIG. 4D, the process continues by branching back (to Step 920:). If the next address is not one associated with the predefined character image from the mapping table, indicated no, then the process continues by branching to Step 950. Thus, FIG. 4D illustrates a preferred embodiment for the methodology for performing user image integration into the video game's audiovisual presentation in accordance with the present invention.

In the preferred embodiment, the user visual image data is mapped into a unique physical address space than that used by the video game software from the Game Card 120 and the system software from VGA140. The unique predefined address space is otherwise unused by the video game apparatus or the game cartridge software, such that user visual images can be directly addressed by the system. Alternatively, specific designated or fixed address space can be associated with a given Game Display Function or predefined character image. Then, as part of an initialization, or a selection routine, the video game apparatus 140 can selectively access the Storage Card 130 instead of the game cartridge 120 by setting up a table in the video game apparatus RAM which permits it to directly address the storage card 130 memory instead of the game cartridge 120 memory, eliminating the need to intercept at all, as to those Game Display Functions or predefined character images represented in the Table.

By knowing the mapping of certain predefined game character image segments for each respective video game, and combining this with a knowledge of the mapping of the user visual images on the Storage Card 130, the intercept controller 110 analysis system 260 directs the substitution of user visual image data for predefined game character image segments.

In accordance with yet another aspect of the present invention, the video game can be made more personal and exciting by utilizing actual video imagery created responsive to user inputs at the individual game apparatus. This aspect of the invention can be utilized in either a stand alone video game, or can be utilized in a multi-user game, either distributed or centrally controlled.

Audio presentation can likewise by associatively integrated into the audiovisual presentation using actual sounds, sound parameters and synthesis or samplers, etc.

Figure 5A:
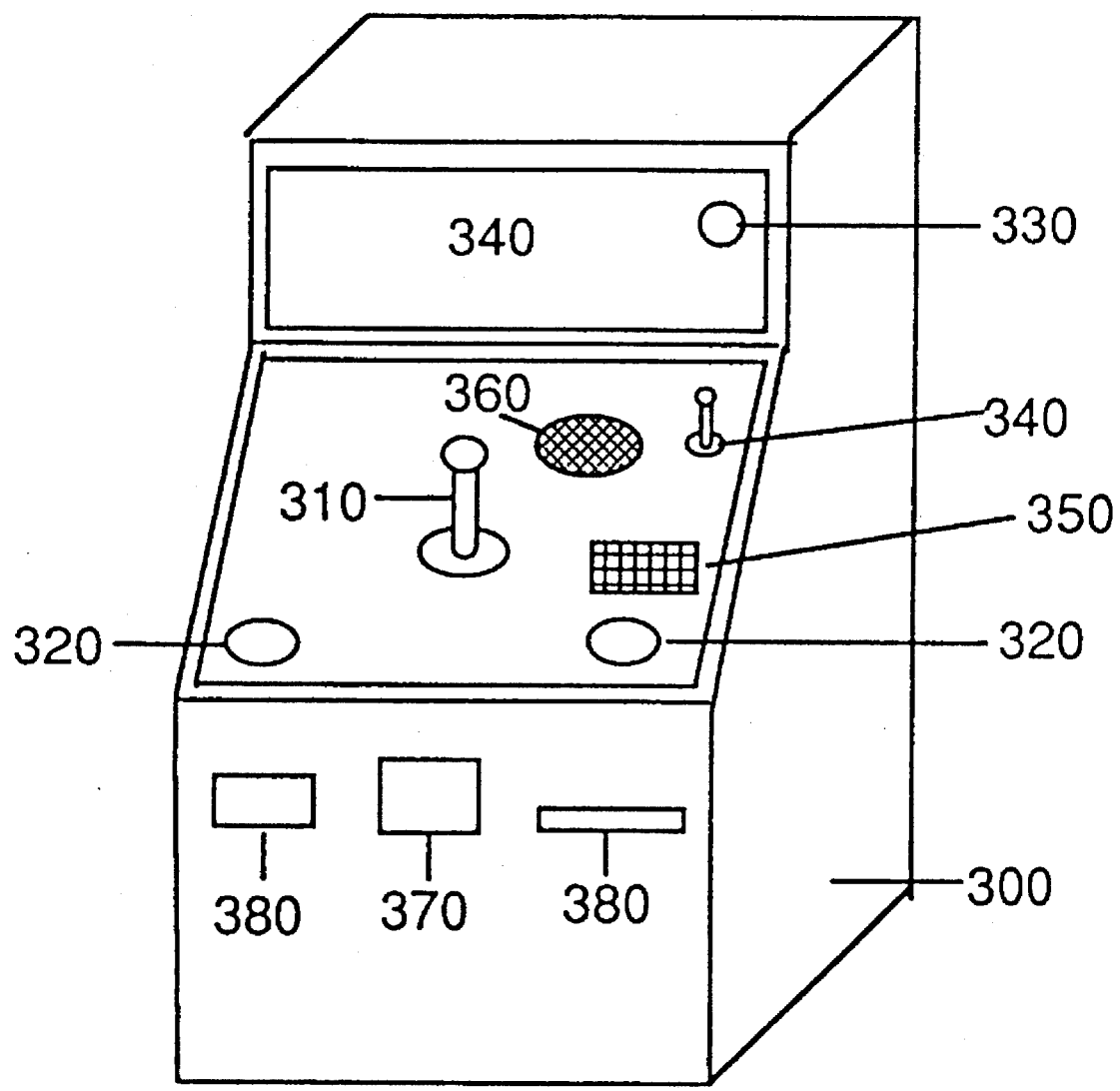
FIGS. 5A–B illustrate various embodiments of an apparatus by which users can input, store, and obtain a removable storage card medium containing user images, in accordance with the present invention.

Referring to FIG. 5A, a video game console is shown which can function as (1) a stand alone video game, (2) an individual user apparatus for coupling to a multi-user game system as described elsewhere herein, and as taught in U.S. Pat. No. No. 4,572,509, by the present inventor; and/or (3) a system for the user to create user visual images and to output the user visual image ("UVI") data for storage on a removable non-volatile storage medium, and (4) optionally to demonstrate an attract mode for UVI games using the stored images. The structure, electronically and logically, of the video game system 300 is shown in FIG. 5A. The video game system 300 includes a processor 302, memory 303, I/O 304, and video output 305 sub-systems, and can be a personal computer (e.g., Macintosh or IBM-PC compatible) based or video game vendor based hardware and software. The video game system 300 has a video image input means, 330 (e.g., video camera, VCR, scanner, etc.) which provides the necessary hardware to input and digitize, process, format, and store a visual image of the user or an image provided by the user. This mode may be selected either by the switch 340 or by input from the keyboard 350 and positioning of the video image input means 330 can be controlled via means of the joy stick 310 with the video image output being displayed on the display screen 340 to provide visual feedback to the user of the individual game apparatus of the image being digitized. When the desired image has been digitized and fed back for display to the user, the user can provide an input stimulus, either from the keyboard 350 or via either of push buttons 320 or via voice recognition, via speaker/microphone 360, or via the switch 340, to cause the storage in the memory of the apparatus 300 of the user visual image data of the user. Alternatively or additionally, the individual game apparatus 300 has the necessary visual recognition processing intelligence to automatically scan the video image input source 330 (e.g., video camera) across the user and select a video image for storage. The system can also differentiate the subject from the background. Alternatively, the user can create images using the video input image means 330 and/or the inputs of the keyboard 350, joy stick 310, switch 340, etc., which can then be selectively associated with one of a plurality of predetermined imagery identifier segments, to create an audiovisual display.

The user created visual display, either of the user or of the user created visual imagery, can then represent that user or any predefined character in the video game audiovisual presentation, either for a stand-alone game, or for a multi-user video game. Thus, for example, the user can create his or her own spacecraft, race car, hero, villain, weapon, monster, or other preselected character functions (e.g., sub-image identifier segments) which can then be incorporated into the overall video game audiovisual presentation in combination with a predefined set of complimentary audio-visual imagery segments according to a predefined set of game rules.

The video image input means 330 can be comprised of one or more of numerous commercially available imaging systems. Solid state (e.g., charge couple device video sensors) or video-tube based camera imaging systems, or other technology as applicable, can be utilized in accordance with this aspect of the present invention. Various lens and focusing arrangements can be utilized, including user controlled, or automatically controlled positioning, focusing and exposure systems. Zoom, crop, etc. features can be provided for use in conjunction with the present invention.

Additionally, or alternatively, other means of user image input can be provided, such as an optional document scanner 380 into which the user feeds a document (e.g., photograph, etc.) for scanning, digitization and storage in the manner as described above for the video image input.

A Storage Card interface 380 is adapted for the user to connect to a Storage Card 130 for storage of User Visual Image data (and other data as appropriate) for removal by the user to later connect to a Storage Card interface on either a video game apparatus 300 or on an adapter interface system 110.

Figure 5B:
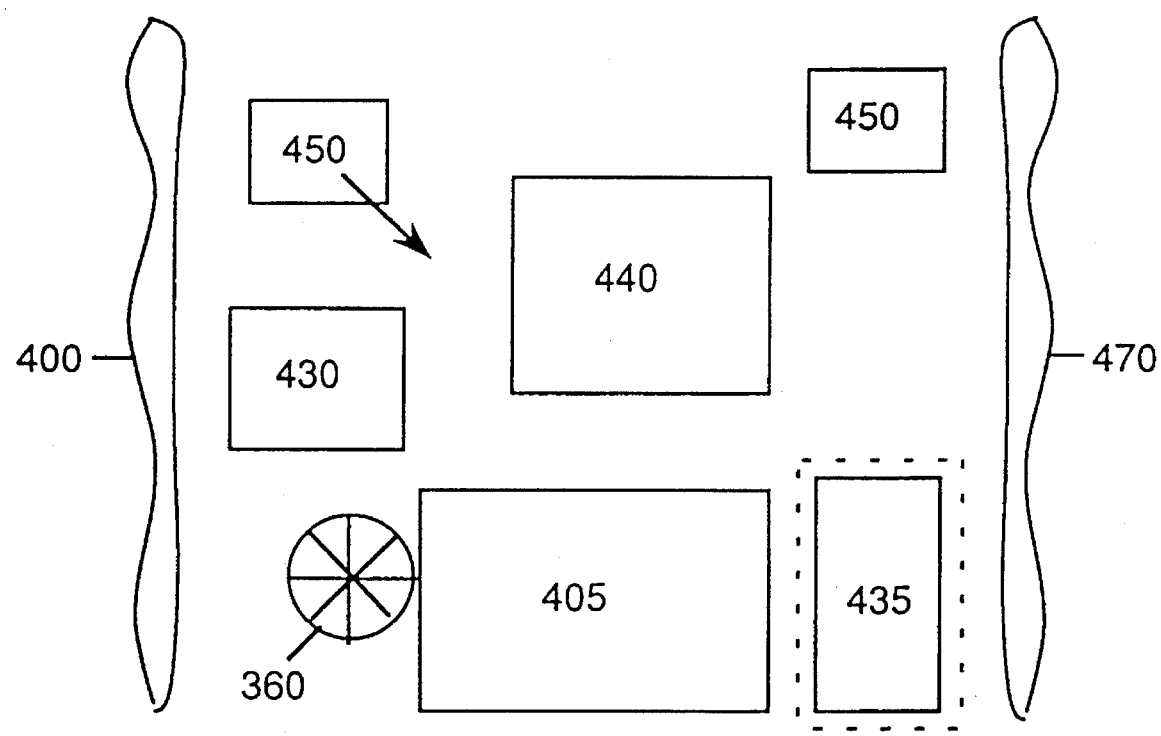

Referring to FIG. 5B, an alternate embodiment of a user visual image storage card creation system is illustrated. As illustrated in FIG. 5B, a booth 400 contains all necessary apparatus and systems to provide user development and creation and/or modification of user visual images for storage, and to provide for the storage, compression, formatting etc., to provide for storage of the user visual images onto the storage card medium. The user enters the booth 400 and can pull the curtain 470 to close behind him or her so that the booth provides a private area with controlled lighting and sound environment. Lighting sources 450 provide illumination onto the user for capture by the video camera 430 under control of the control console 405 which can be a custom or semi-custom computerized system design, or can utilize semi-custom programming and peripherals in conjunction with a personal computer or micro or minicomputer. Examples of personal computers would include the Amiga computer by Commodore, the Apple Macintosh, etc. The system of FIG. 5B preferably includes one or more means of image input as described with reference to FIG. 5A.

Figure 6:
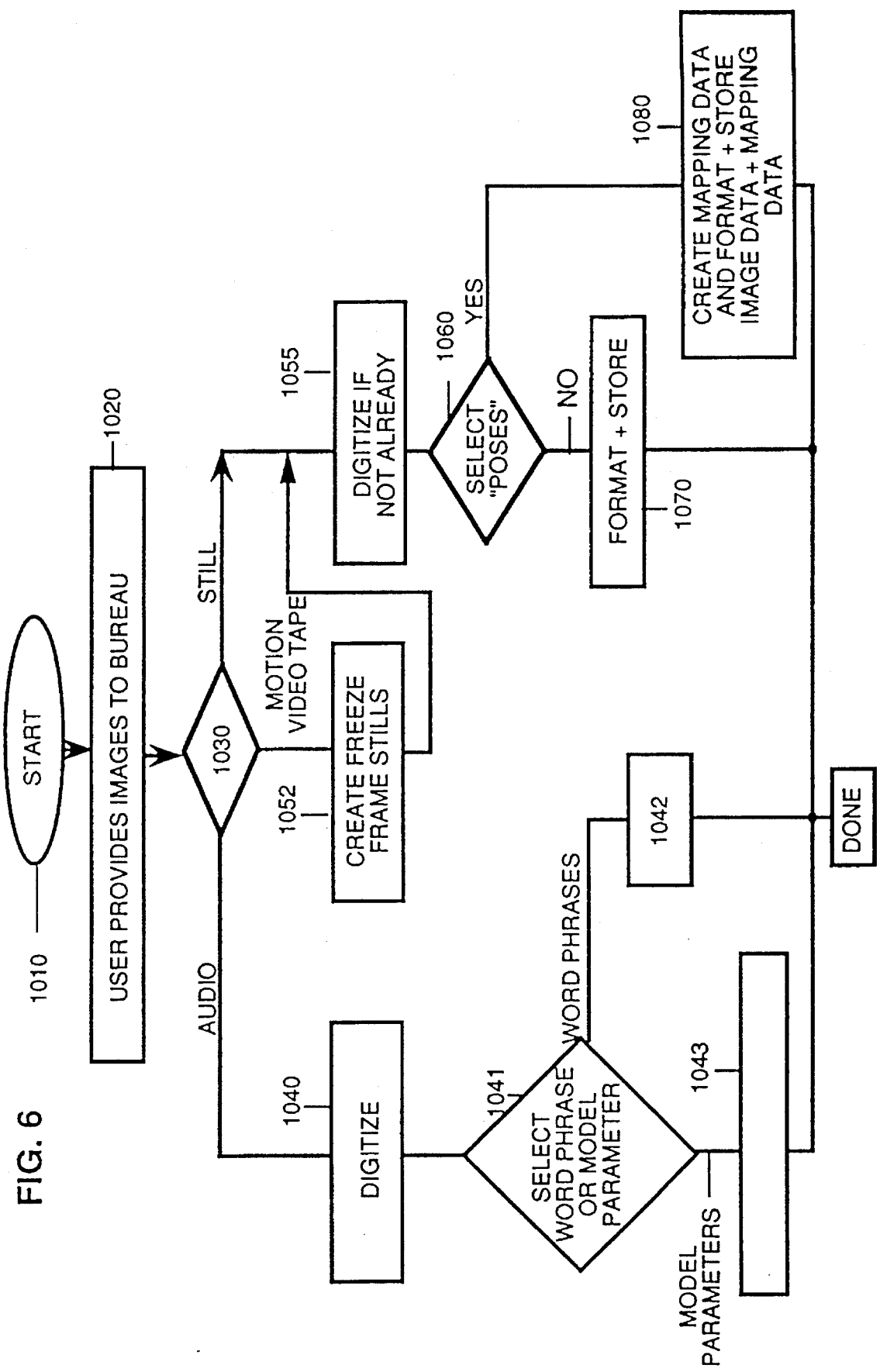
FIG. 6 illustrates a process by which an outside service bureau can be utilized to create and provide the storage card medium containing the user images, which storage card can be used with any of the systems of FIGS. 1A–C and FIGS. 2A–D, in accordance with the present invention.

Referring to FIG. 6, a flowchart illustrates the process for a service bureau creation of storage cards from user provided image data, such as VHS video tapes, eight millimeter video tapes, still photographs, floppy disks from computers containing digitized images, floppy disks from still cameras, audio inputs, and parameter data for computer generated video and audio, stored on any medium.

The use of a service bureau can extend beyond video games. These storage cards can be used for a lot more than games. They could also be used to incorporate users into new or existing movies, allow users to preview how they would look in new clothes, be used to see how various transformations (aging, etc.) would affect a user, etc. This card could plug into a variety of devices other than video games, such as teleconferencing and security.

As shown in FIG. 6, (Step 1010:) the user starts (Step 1020:) by providing the images to the service bureau. This can be done in various ways, such as an in-store program at stores which sell the video game cards, video game apparatus, systems or related materials. This can also be done via a mail-in or a walk-in service, not as part of an existing store, or via modem link. After the user has provided the images to the service bureau, different processing steps are utilized depending on the form of input (e.g., analog, digital, video still, video motion, and audio, etc.). (Step 1030:) A decision is made as to which path is taken. (Step 1040:) For audio, the input is preferably speech which is digitized and word phrases selected or model parameters extracted. (Step 1041:) If word phrases are selected, then (Step 1042;) the process provides formatting, mapping and storage of the word phrase digitized data along with the associated mapping information. Alternatively, (Step 1042:) if model parameter data is present, the model parameter data is formatted and mapped for utilization by a sound synthesizer to operate in accordance with the model parameters. (Step 1055:) If the user images are still motion, then the process continues to digitize them if not already digitized. (Step 1052:) If the user images are motion video, then they are first freeze-framed to create a still, and digitized if necessary. From there both still and motion video are processed similarly, in that (Step 1060:) a decision is made to select poses. If yes, (Step 1080:) canned poses are selected, mapping data and formatting is generated, and the image data and mapping data are stored onto the storage card medium. If no poses are selected (Step 1070:) then the image data is formatted, mapped, and stored, for use and assignment to particular game functions other than poses. If model parameter data is present, it is formatted and mapped for utilization in presentation generation.

It is to be understood that the process illustrated above with reference to FIG. 6 is exemplary and that many other options and variations are possible.

Figure 7A:
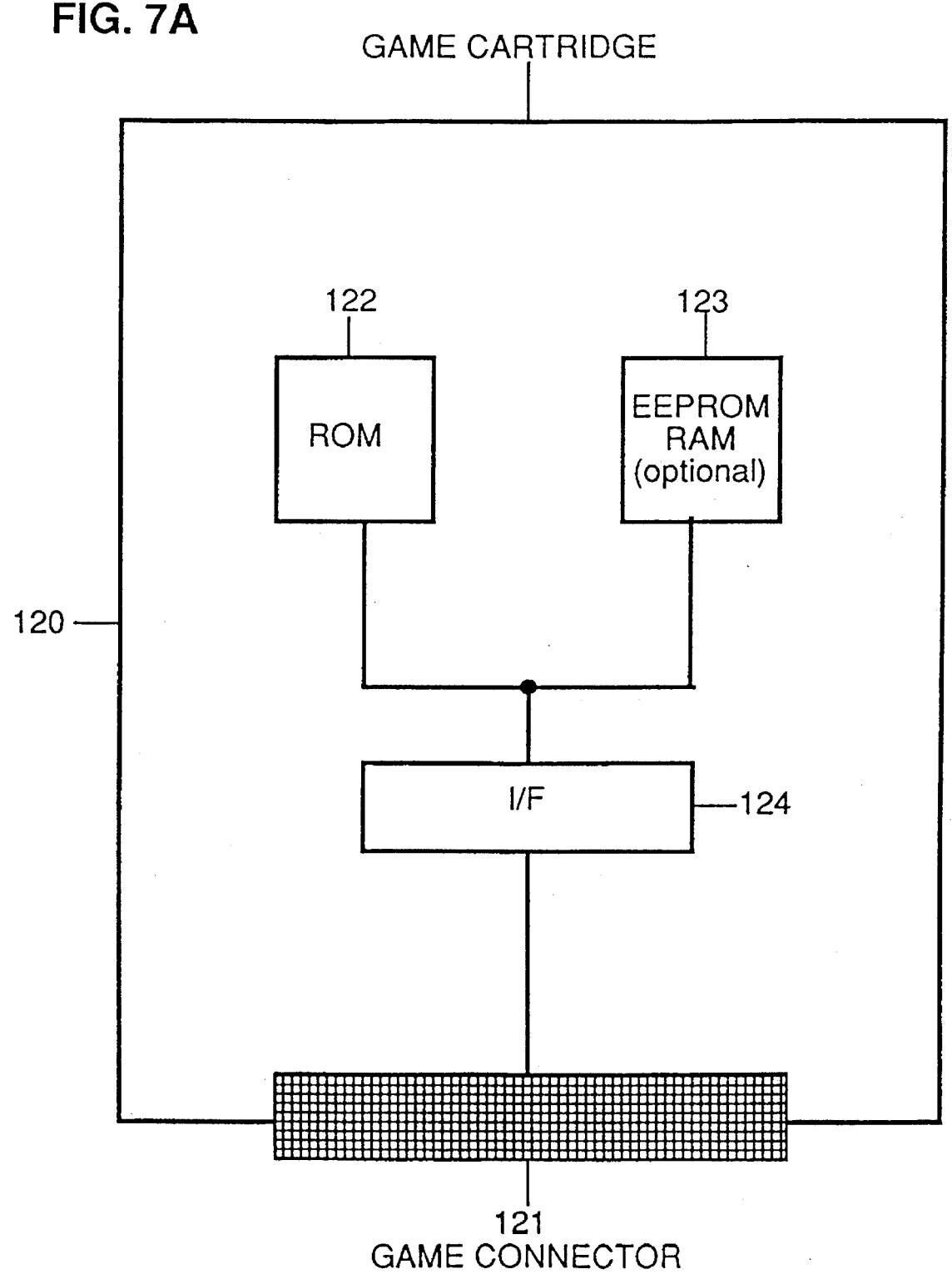
FIG. 7A illustrates a game cartridge for use with the system illustrated in FIG. 1A.

Referring to FIG. 7A, one embodiment of an apparatus by which users can input and store user image data and obtain a removable storage card medium containing user images thereon is illustrated. The game card (or cartridge) 120 of FIG. 6A includes both the nonvolatile storage memory 122 (such as ROM or EPROM) containing the game software and logic, and a writable nonvolatile memory 123, such as RAM or EEPROM (although volatile memory could be used in those applications not requiring the memory function of memory 123 be maintained when power is removed). The memories 122 and 123 are coupled to adapter interface controller 124, which is also coupled to the game connector 121. The game cartridge illustrated in FIG. 7A is compatible with FIGS. 1B, 1C, and 1D.

Figure 7B:
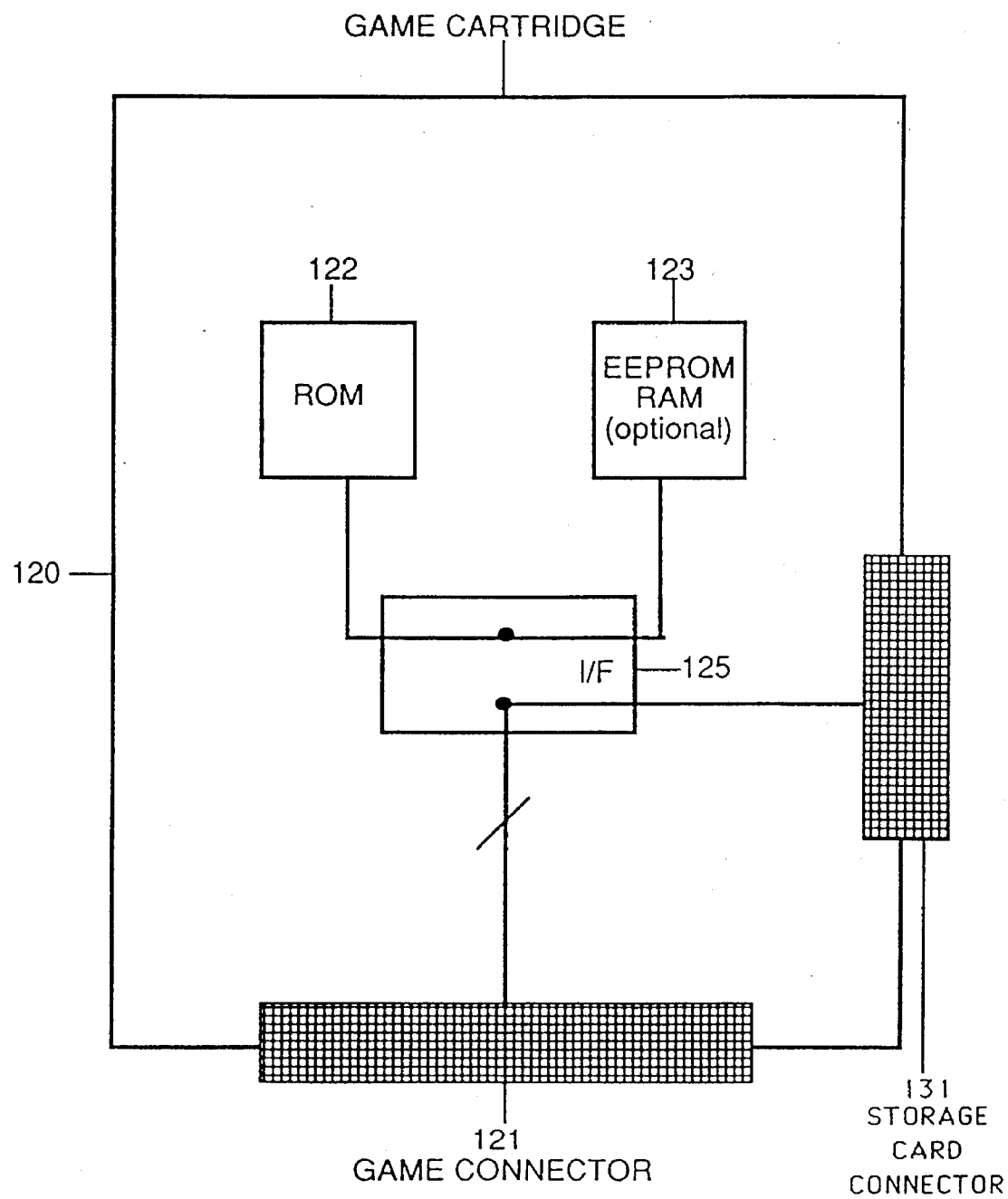
FIG. 7B illustrates a game cartridge compatible with the system illustrated in FIG. 1B, and which optionally may be used with system of FIG. 1C where the storage card is coupled to an input/output port instead of to the game cartridge, in accordance with the present invention.

Referring to FIG. 7B, an alternate game card including the storage card interface is illustrated. The game cartridge 120 of FIG. 7B is illustrated as game cartridge of 120F of FIG. 1E. The memories 122 and 123 are coupled to adapter interface 125, which is also coupled to the storage card connector 131 and to the game connector 121. The game cartridge in FIG. 7B is usable with the systems of FIGS. 1A, 1B and 1E.

It will be appreciated that numerous other configurations of game cartridges can be provided, including different use of memory, use of only a single nonvolatile storage memory without a second memory, the addition of processing power and/or control logic, etc., as the application and cost constraints dictate.

The writable memory 123 of FIGS. 7A and 7B is a variable/optional component of the game card. When present, the size of the writable memory 123 can be fixed or can vary depending upon the application or scope of applications to which it is expected to function in. The memory 123 can also provide additional processor, scratch pad and buffer memory area to support additional computational needs of the processor to support the analysis and integration process of the present invention. Where an interface adapter unit is present, it can contain writable memory and/or additional special processors, and the memory 123 is not required to perform scratch pad memory functions for the processor if there is sufficient other memory present. Additionally, in new video game or other audiovisual presentation systems, or by retrofitting old game systems, additional memory can be provided for user image integration utilization. The writable memory 123 provides local storage for the downloading of user image data, either from the storage card via direct link or via transmission downloading such as via modem, and provides for the loading and storing of the user image data into the memory 123 for retention in the game card thereafter without requirement of attachment of a storage card thereto. Thus, the user image data is thereafter accessible as a part of the game card subsystem unless and until modified.

The use of the writable memory 123 also permits machine specific considerations regarding resolution and formatting of the user image data including video resolution and video formatting as well as data structure and image mapping considerations. Additionally, machine specific considerations regarding views and rendering can be provided for.

Figure 8:
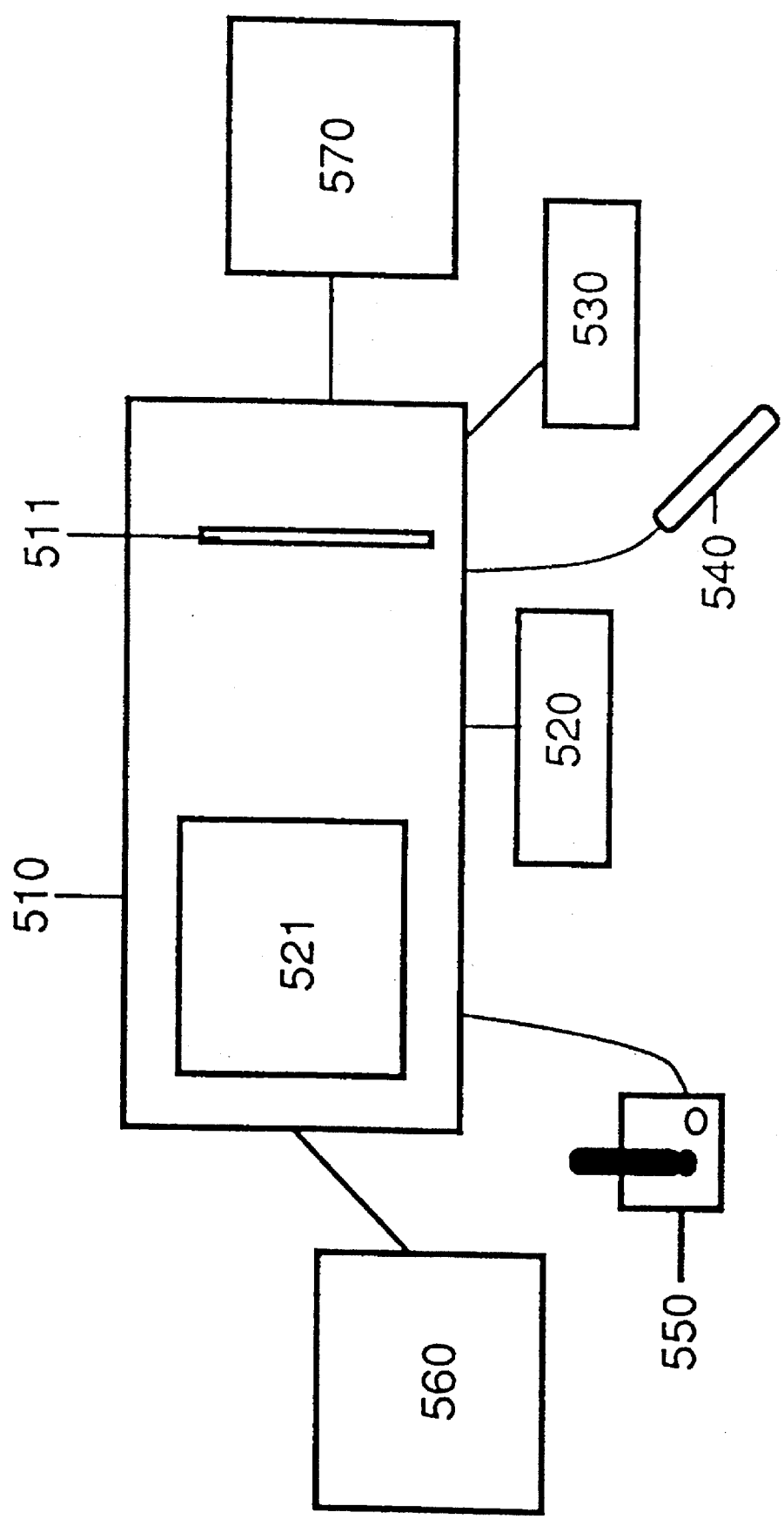
FIG. 8 illustrates a personal computer based system for one or both of user image development/storage and user image video game play employing the present invention.

Referring to FIG. 8, a system embodying the present invention is illustrated. A central computer system 510 having a secondary storage means 511 such as a disc drive or Storage Card is coupled to a keyboard 520 and a display device 521 (such as a cathode ray tube, LCD, LED, etc.). Additionally, the computer system 510 is coupled to a mouse or other input device 530, a light pen 540, a joystick 550, a document reader 560, and a camera 570. Depending on the particular needs of the user, the system can comprise less than all of these accessories, but must have some sort of user input device, such as a keyboard 520, mouse 530, light pen 540, joystick with push button 550, document reader 560, camera 570 or some other type of computer data input device such as a modem providing telephonic communication of digital data to the system.

Figure 9:
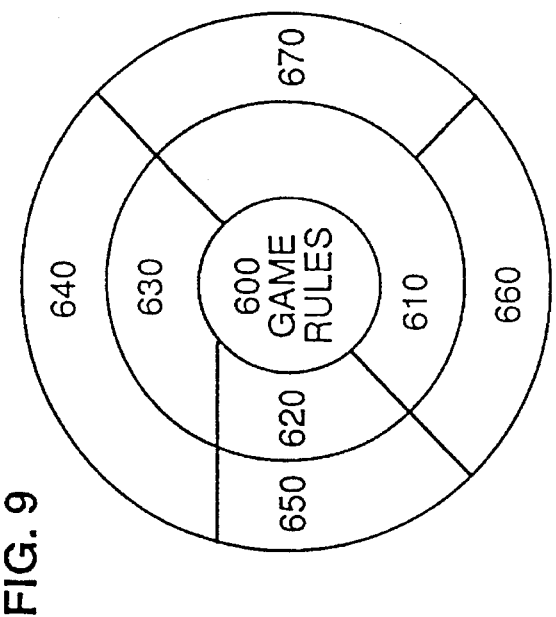
FIG. 9 illustrates the logic structure for the user image defined video game.

Referring to FIG. 9, the structure of the user defined visual image video game logic is illustrated. The center of the logic structure is the game rules 600. The game rules 600 interface with the predefined function mapping logic 610 which interfaces with both the predetermined video graphic objects 660 and the user defined videographic objects 670. The game rules utilize the predefined function mapping to access the predetermined and user defined videographic objects, which objects are then integrated into the visual display as is described hereafter. Game rules logic 600 also interfaces to the display logic 630 which interfaces to the display interface logic 640 which provides for driving the video display. The game rules logic passes the appropriate videographic objects to the display logic which interfaces to the display interface logic which provides for display of the game audiovisual presentation. Additionally, the game rules logic also interfaces to the input/output logic 620 which interfaces to the input/output interface logic 650. The external user input/output devices for the video game, such as in joysticks, light pens, keyboards, etc. are coupled to the system via the I/O interface logic 650 which translates these inputs to a form compatible for transfer to the input/output logic 620 which couples appropriate input/output data to the game rules logic 600. The game rules logic 600 utilizes the data from the input/output logic 620, and from the videographic objects data 660 and 670 via the predefined function mapping 610, to provide for a display presentation via the display logic 630 and display interface 640.

Figure 10:
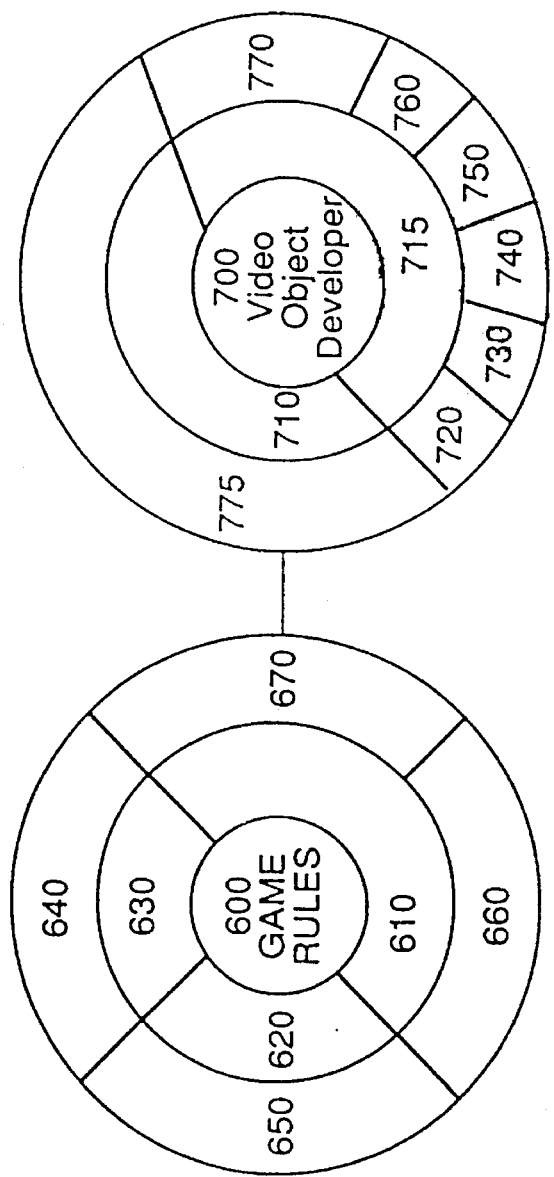
FIG. 10 illustrates the structure and interface of the game development system logic to the video game logic structure.

Referring to FIG. 10, the logical interface of the game development system of the present invention to the video game structuring logic of the present invention is illustrated. The game rules logic 600, predefined function mapping logic 610, I/O logic 620, display 630, display interface logic 640, I/O interface logic 650, predetermined videographic objects 660, and user defined videographic objects 670, of FIG. 9 are analogous to the correspondingly numbered items of FIG. 8. Further, in accordance with the present invention, the universal video game design system interfaces to the user defined videographic objects logic of the video game logic, providing for downloading of user defined videographic objects from the user visual image in video game design system to the video game logic. The user visual image in video game development system logic is comprised of a nucleus of user video object development logic 700, which interfaces with user input interface logic 715, which interfaces with keyboard interface logic 320, mouse interface logic 730, light pen interface logic 340, joystick interface logic 750, document reader interface logic 360, and camera interface logic 730, which each interface to the respective keyboard 520, mouse 530, light pen 540, joystick 550, document reader 560, and camera 570, of FIG. 1. Additionally, where other input devices are utilized, additional interface logic will be provided. The input device thus is coupled into the universal video game development system via the interface logic 720, 730, 740, 750, 760 and/or 770, via the user input interface logic 715, which couples the data to the user video object developer logic 700. The user video object developer logic 700 is also interfaced to the universal linker logic 710 and therefrom to the link interface logic 775 which couples the final user developed video objects to the video game system logic 570. This can be in the form of loading files onto a diskette or hard disk, or a run time loading of data directly into the computer memory prior to running of the game program on the game system. The universal linker logic 710 provides the necessary functional mapping to properly map the user developed video objects into the appropriate locations and file names for the user defined videographic object logic 670, such that the video game system will function properly.

The systems described with reference to the figures herein, can all be built from presently available technology as is necessary to implement all functions herein, including, but not limited to (1) the recognition and/or identification of Predefined Character Images and (2) the real-time User Image capture and association to the Predefined Character Images, and, (3) the integration of the User Image into the audiovisual presentation.

While there have been described above various embodiments of distributed video game systems for the purpose of illustrating the manner in which the invention can be used to advantage, it will be appreciated that the invention is not limited to the disclosed embodiments. Accordingly, any modifications, variation, or equivalent arrangement within the scope of the accompanying claims should be considered to be within the scope of the invention.

What is claimed:

1. A method of integration of a user image into a predefined audiovisual image source, the method comprising the steps of:

providing a user image;

first providing a presentation output from the audiovisual image source;

then selecting a portion of the presentation output as a selected portion for user image associative integration;

then analyzing the presentation output associated with the selected portion;

then integrating the user image with the selected portion; and providing a modified presentation output wherein the user image is associated with and integrated into the selected portion in the presentation output.

2. The method as in claim 1 further characterized in that said user image is at least one of a video image, an audio soundtrack, sound parameters for driving a sound synthesizer, control signals, and graphics parameters for driving a graphic synthesizer.

3. The method as in claim 1 wherein said step of providing a user image is further comprised of the step of:

providing for at least one of user original creation, modification and selection of the user image.

4. The method as in claim 1 further comprising the step of:

scaling the user image to fit within the selected portion.

5. The method as in claim 1, wherein the predefined presentation output is comprised of a video game display presentation.

6. The method as in claim 5 further comprised of the steps of:

providing an image data packet comprising the user image data;

providing a family of different video games each with its own unique predefined video game display presentation, wherein within the family each different video game provides user image integration compatibility responsive to said image data packet.

7. The method as in claim 6, further characterized in that the image data packet is comprised of the user image data and header data related thereto.

8. The method as in claim 5 further comprised of means for detecting predetermined user actions during active play of the video game during selected portions of the video game display presentation, wherein said step of integrating said user image is further comprised of the step of:

integrating said user image into said video game display presentation for selective associative substitution of the user image in place of the selected predefined image only responsive to said predetermined user actions.

9. The method as in claim 5, further characterized in that said video game system provides default game response rules, further comprising the steps of:

monitoring user biological signals, modifying the default game response rules responsive to the monitoring.

10. The method as in claim 5, wherein the user image is further associated with behavioral profile rule data, the method further comprising the step of:

adjusting behavioral performance of the selected predefined displayed image in the video game responsive to the behavioral profile rule data.

11. The method as in claim 1 further characterized in that said user image is comprised of a plurality of user images from which one or more user images are selectively integrated into the modified presentation output.

12. The method of claim 1 wherein the user image is further associated with parameter data, the method further comprising the step of:

altering the user image data for texture wrapping of the user image onto the selected portion so as to effectively wrap the user image over the selected portion responsive to the parameter data.

13. A method of integration of an image from a secondary source into a predefined audiovisual image source, the method comprising the steps of:.

providing a presentation output from the audiovisual image source;

providing a user image from the secondary source; and providing a presentation architecture having means that integrate and utilize the user image from the secondary source to participate with predefined associative actions in the presentation output as an extra actor.

14. The method as in claim 13 wherein the presentation architecture has means that provide for a plurality of independent presentations, each separate and distinct from each other wherein each integrates the user image from the secondary source to participate in the presentation as an extra actor.

15. The method as in claim 13 further including the step of:

providing a plurality of secondary sources, each secondary source having a separate extra actor separately participating in the presentation.

16. An audiovisual presentation adapter interface system for user image integration into a presentation output, the system comprising:

image means for providing user image data representative of the user image;

presentation source means for providing said presentation output;

separate and removable interface adapter means comprising means for selecting a portion of the presentation output as a selected portion for user image associative integration;

means for analyzing the presentation output to identify the selected portion;

means for associating the user image with the selected portion;

means for integrating said user image data with the selected portion; and presentation means for providing a modified presentation output wherein said user image is integrated to form a part of the modified presentation output.

17. The system as in claim 16 wherein the presentation source means is comprised of storage means structured in a predefined architecture arranged to have identifiable images indexed within the predefined architecture, said system further comprising:

means for providing one or more user image data packets, each having an associated user image, each with its own index, indexed within the predefined architecture;

means for selecting a particular identifiable image from the identifiable images as the selected portion;

means for selecting at least one of the user image data packets as selected user image data for association with the particular identifiable image;

means for integrating said selected user image data into said predefined architecture by substituting the index of the selected user image data for the index of the particular identifiable image; and wherein the presentation means provides an integrated presentation output as the modified presentation output responsive to said predefined presentation image data and said selected user image data, comprising images wherein said selected user image is associated with said particular identifiable image.

18. The interface system as in claim 17, wherein the video game software provides the predefined presentation image data, the system further comprising a user input apparatus responsive to user provided stimulus, and a video game apparatus responsive to the video game software and the user input apparatus, for providing video game play and a video game presentation that has one or more predefined game display functions selectively associated with the particular identifiable image, which interact in the video game presentation, said interface system further comprising:

means for selectively associating one of the predefined game display functions with the particular identifiable image for incorporation into said video game audiovisual presentation responsive to the user image and to the user actively playing a video game.

19. The interface system as in claim 16 wherein the interface adapter means is adapted for coupling to an audiovisual system providing for output of a presentation including a predefined character having a default behavior pattern of displayed behavior responsive to the user;

wherein said interface system is further comprised of:

means for modifying the default behavior pattern of the predefined character responsive to a measured physiological response of the user during presentation wherein the presentation output is altered in response to the measured physiological response.

20. The interface system as in claim 19 wherein the audiovisual system provides an interactive video game.

21. The system as in claim 16 wherein the presentation means integrates and utilizes the user image to participate in the presentation output as an extra actor.

22. The system as in claim 16 wherein said presentation means is comprised of one of a video tape player, a video disc player, a video game, and a computing system.

23. The system as in claim 16 wherein said means for analyzing is further comprised of means for providing at least one of signature analysis, signal analysis, timing analysis, state analysis, and transform analysis.

24. The system as in claim 16, further comprising:

means providing for selection of the user image for inclusion in the modified presentation output, wherein the user image is associated with a unique user image display function which is only present in response to the selection of the user image.

25. The system as in claim 16 wherein the user image is stored onto a separate and removable storage means.

26. The system as in claim 16 wherein the user image is stored onto a transportable storage means and the presentation output integrates and uses the user image from the transportable storage means, when coupled thereto, to participate in the presentation output as an extra actor.

27. A method of integrating a user voice image into an audiovisual presentation of a video game, the method comprising the steps of:

sampling a user's voice:

analyzing the sampled user's voice to provide user voice parameter data representative of the user voice image:

storing the user voice parameter data;

synthesizing and interjecting the user's voice into the video game audiovisual presentation responsive to the user voice parameter data comprising the step of associating a particular predefined character image within the video game presentation with the user's voice so that when the particular predefined character is speaking, the user voice parameter data is input as a model to a voice synthesizer which effects the integration of the user's voice into the audio portion of the audiovisual presentation as associated with the predefined character image.

28. A video game interface system comprising:

interface means for coupling to an existing video game system providing a presentation output comprising predefined images, said interface means being separate and removable from said video game;

user image storage means containing data for a user image for association with a selected predefined image;

the interface means comprising;

means for analyzing the requests for predefined images to identify a request for the selected predefined image; and means for intercepting the requests for the selected predefined image and substituting the user image in place of the predefined image data, wherein the user image is associated with and replaces the selected predefined image in the presentation output.

29. The system as in claim 28, further comprising:

expander means adapted to permit simultaneous coupling of multiple ones of the user image storage means, so as to permit each of the user image storage means to have a respective user image associated with a respective different predefined image; and interface subsystem means providing means for the video game system to separately identify and utilize each of the multiple user image storage means and the user images stored thereon.

30. The system as in claim 28 wherein the user image storage means is removable and transportable from the video game interface system.

31. The system as in claim 28 wherein the user visual image storage means is at least one of a separate removable transportable cartridge, solid state memory, and a compact disk read only memory.

32. A video game system comprising:

writable memory;

application software including default character image data having an associated default character address;

means for providing a video game presentation of video game play responsive to the application software comprising a default video game presentation comprising default character images having associated addresses, responsive to no selection of a user image;

a non-volatile storage means for storing an image data packet (IDP) file representative of a user image;

means for linking the IDP file from the storage means for combinational mapping into the application software for the video game; and means for integrating the IDP file and the user image into the presentation of the video game play;

means for selecting said user image data for inclusion in the presentation;

means for selecting one of the default character images as a selected default character image;

means for providing key data associated with the user image data, and means for integrating said user image data into said video game presentation wherein the user image data is integrated responsive to the key data, wherein said key data is utilized to load a mapping table within the writable memory providing an index for direct interception and substitution wherein the user image data is output in place of the selected default character image.

33. The system as in claim 32 further characterized in that said user image is stored on a storage card, said system comprising:

means for storing video game play parameters for end of game on the storage card prior to ending active game play;

means for resuming video game play from a point in game rules and logic for said end of game responsive to the video game play parameters stored on the storage card.

34. The system as in claim 32 wherein the user image data is mapped into an allocated predefined address space that is otherwise unused by the video game system and the application software, such that the user image is directly addressed by the system, and wherein an address space map table is provided which permits direct addressing of said user image data by the video game system wherein the user image is integrated into said video game display presentation.

35. The system as in claim 32, wherein the user image is at least one of color, size, graphics, shape, a digitized image of the user's face, a user created original image, and a user selected one of a predetermined set of visual images.

36. The system as in claim 32 wherein the means for integrating automatically integrates as a part of a game initialization procedure of the application software, whereafter the IDP files remain integrated in the video game until changed.

37. The system as in claim 32 wherein said application software is comprised of an address map table of displayable graphic functions, said system further comprising:

means for selecting a selected one of the displayable graphics functions;

character selection means providing for association of the user image with the selected displayable graphic function in the audiovisual presentation, responsive to the address map table.

38. The system as in claim 32, wherein the displayable graphic functions are comprised of default displayable graphic functions and non-default displayable graphic functions created especially to utilize the user image, wherein the video presentation is comprised of a default video presentation comprised of the default displayable graphic functions, and a non-default video presentation comprised of both the default and the non-default displayable graphic functions and provided responsive to the character selection means.

39. An adapter interface system for coupling to a video game system comprising video game application software providing for a self-contained video game having an associated predefined audiovisual presentation, comprising:

a non-volatile storage medium containing data stored as one or more image data packets;

selection means for selecting one or more of the image data packets for integration into the video game;

image integration means for linking the one or more selected image data packets into the application software wherein the image data packets and the application software together become an integral self-contained video game having an associated audiovisual presentation adapted from the predefined audiovisual presentation and the selected image data packets.

40. The system as in claim 39, wherein the image data packets are linked to one or more game functions wherein the image data packets are incorporated into the overall video game presentation in association with said game function in combination with a predefined set of complimentary audiovisual segments.

41. The system as in claim 39, wherein the linking is comprised of combinational mapping and integrating.

42. An audiovisual presentation system providing a presentation output, said system comprising:

means for providing a user image;

integration means for mapping the user image into the presentation output as an extra actor with predefined associative action wherein the user image becomes a part of the presentation output.

43. The system as in claim 42, wherein the predefined presentation output is comprised of at least two predefined presentation outputs comprised of a default predefined presentation output having default predefined character images with associated default predefined actions, and a user image predefined presentation output, wherein the user image predefined presentation output is comprised of the default predefined presentation output with the addition of the integration of an extra actor predefined character with associated predefined actions uniquely associated with only the user image.

44. The system as in claim 42 further comprising:

means for providing audiovisual presentation data for the audiovisual presentation;

means for identifying defined portions of the audiovisual presentation data for integration with the formatted user-image data;

means for integrating the formatted user image data with the defined portions of the audiovisual presentation data to provide integrated image data;

means for providing an integrated audiovisual presentation responsive to the integrated image data.

45. The system of claim 44 wherein the audiovisual presentation is associated with a video game system operating responsive to a predefined stored game program having a structure wherein the formatted user image data is selectively mapped to be associated with a predefined game function.

46. An entertainment system comprising:

an audiovisual source for providing signals to be viewed as a presentation;

a presentation system for displaying the signals responsive to the audiovisual source;

storage means for storing a user image; and controller means for analyzing the signals, and for selectively modifying the signals to integrate the user image with predefined associative actions into the presentation.

47. The system as in claim 46 further comprising means for generating the user image.

48. The system as in claim 46 wherein the presentation includes predefined characters and predefined images, wherein the user image interacts with the predefined characters and predefined images after the user image is integrated into the presentation.

49. The system as in claim 46 wherein the means for generating a user image comprises:

a camera for generating at least one image of the user, the image being in the form of analog video signals;

an audio transducer for generating an analog audio signal; and a converter for converting the analog video and audio signals to digital video and audio signals capable of being stored on the storage means.

50. The system as in claim 46 wherein the storage means is removable and separable from the system.

51. The system as in claim 46 further comprising:

means for enabling the user image to participate in the presentation as an extra actor.

52. The system as in claim 46 wherein the storage means is usable as a means for admittance into an entertainment area.

53. The system as in claim 46 wherein there are a plurality of independent audiovisual sources each associated with a respective one of a plurality of independent ones of the presentation system.

54. A method of integrating a user voice image into a presentation output, the method comprising the steps of:

sampling a user's voice;

analyzing the sampled user's voice to provide user voice parameter data representative of the user voice image;

storing the user voice parameter data;

synthesizing and interjecting the user's voice into the presentation output responsive to the user voice parameter data comprising the step of associating a particular predefined character image within the presentation with the user's voice so that when the particular predefined character is speaking, the user voice parameter data is input as a model to a voice synthesizer that effects the integration of the user's voice into the presentation output as associated with the predefined character image.

55. The method as in claim 54 further characterized in that the plurality of audiovisual presentations are associated with various amusement attractions.

56. A video interface system comprising:

means for coupling to an existing video system comprising software providing requests for predefined images;

means for providing a presentation comprising the predefined images;

storage means containing data for a user image for association with a selected predefined image, the storage means being removable and transportable from the video interface system;

an intercept adapter interface system comprising:

means for analyzing the requests for predefined images to identify a request for the selected predefined image; and means for intercepting the requests for the selected predefined image and substituting the data for the user image in place of the predefined image, wherein the user image is associated with and replaces the selected predefined image in the presentation.

57. The system as in claim 56 wherein the software is stored in a software cartridge, the system having means for coupling to the software cartridge, wherein the system is coupled to (a) a host video system that provides the presentation, (b) to the software cartridge, and (c) to the storage means, the intercept adapter system further comprising:

means for associating the user image with a selected associated predefined character image;

analysis means for analyzing the data associated with the selected associated predefined character image and selectively modifying certain ones of the data to substitute therefor the associated user image data; and means of providing the substituted user image data to the presentation for use therein, wherein the user image is associated with and replaces the selected predefined character image in the presentation.

58. A system for integrating an image from a secondary source into a predefined audiovisual image source, comprising:

means for providing a presentation output from the audiovisual image source;

means for providing a user image from the secondary source; and means for providing a presentation architecture having means that integrate and utilize the user image from the secondary source to participate with predefined associative action in the presentation output as an extra actor.

59. A system for integrating a user image into a predefined audiovisual image source presentation output, comprising:

means for providing a user image;

means for selecting a image portion of the presentation output as a selected portion for user image associative integration, means for analyzing the presentation output associated with the selected portion;

means for integrating the user image with the selected image portion; and means for providing a modified presentation output wherein the user image is associated with and integrated into the selected image portion in the presentation output.

* * * * *

UNITED STATES PATENT AND TRADEMARK OFFICE
CERTIFICATE OF CORRECTION

PATENT NO. : 5,553,864

DATED : 9/10/96

INVENTOR(S) : David H. Sitrick

It is certified that error appears in the above-indentified patent and that said Letters Patent is hereby corrected as shown below:

In the drawings, Sheet 9, FIG. 2B, the reference numeral "110B" should be --110C--. Sheet 10, the "Image Data Packet Table" should have reference numeral 30 applied thereto.

Column 6, line 13, "1A" should be --1A-1B--; line 17, after "signals" --The AIS 110 can alternatively be an integral part of the video game apparatus and/or storage cards 120, 130.-- should be inserted.

Column 9, line 63, "1100" should be --110--.

Column 12, line 29, "260" should be --260B--.

Column 13, line 16, after "port" --of video game apparatus-- should be inserted; line 17, "130" should be --130C--; line 22, "120C" should be --120--; line 25, "130" should be --130C--.

Column 15, line 48, "110" should be --110C--.

Column 16, line 18, after "herein" --such as regarding FIG. 1B-- should be inserted; line 19, "110I" should be --110C--; line 22, "110I" should be --110C--.

Column 17, line 4, after "30" --(SEE FIG. 3)-- should be inserted.

Column 19, line 40, "110" should be --110E (FIG. 4A)--.

Column 25, line 41, "380" should be changed to --370--; line 61, after "430" --or other image source 440-- should be inserted.

Column 26, line 2, after "input" --440-- should be inserted, after "FIG. 5A." --A detachable/removable storage card interface subsystem 435 provides for transfer and storage of the user image responsive to the controller 405.-- should be inserted.

UNITED STATES PATENT AND TRADEMARK OFFICE
CERTIFICATE OF CORRECTION

PATENT NO. : 5,553,864
DATED : 9/10/96
INVENTOR(S) : David H. Sitrick

It is certified that error appears in the above-indentified patent and that said Letters Patent is hereby corrected as shown below:

Column 28, line 39, "320" should be changed to --720--; line 40, "340" should be changed to --740--; line 41, "360" should be changed to --760--; line 46, after "logic" --770-- should be inserted.

Column 31, line 18, "predefined" should be deleted; "image data" should be changed to --output--; line 22, "the" should be deleted; line 23, "the" should be deleted; line 24, after "data" --representative of the presentation output-- should be inserted.

Signed and Sealed this

Twenty-first Day of October 1997

*Attest:*

BRUCE LEHMAN

*Attesting Officer*     Commissioner of Patents and Trademarks